United States Patent [19]

McGinlay et al.

[11] Patent Number: 4,568,988
[45] Date of Patent: Feb. 4, 1986

[54] MICRO HARD-DISK DRIVE SYSTEM

[75] Inventors: James G. McGinlay, Kirkcaldy; Roderick M. Urquhart, Glenrothes, both of Scotland

[73] Assignee: Rodime plc, Glenrothes, Scotland

[21] Appl. No.: 582,554

[22] Filed: Feb. 22, 1984

[51] Int. Cl.⁴ .................. G11B 5/012; G11B 5/55; G11B 5/56
[52] U.S. Cl. .......................... 360/77; 360/78
[58] Field of Search ............... 318/611, 634; 360/77, 360/78, 97, 98, 135

[56] References Cited

U.S. PATENT DOCUMENTS

| | | | |
|---|---|---|---|
| 3,500,363 | 3/1970 | Shill. | |
| 3,609,721 | 9/1971 | Meneley | 360/97 |
| 3,924,268 | 12/1975 | McIntosh et al. | 360/78 |
| 4,062,049 | 12/1977 | Dirks | 360/78 |
| 4,161,004 | 7/1979 | Dalziel | 360/106 |
| 4,163,996 | 8/1979 | Kaseta et al. | 360/97 |
| 4,164,766 | 8/1979 | Kaseta et al. | 360/97 |
| 4,164,769 | 8/1979 | Kaseta et al. | 360/106 |
| 4,185,310 | 1/1980 | Kaseta et al. | 360/97 |
| 4,194,226 | 3/1980 | Kaseta et al. | 360/106 |
| 4,317,146 | 2/1982 | Gervais | 360/98 |
| 4,323,939 | 4/1982 | Iftikar et al. | 360/106 |
| 4,367,502 | 1/1983 | Iftikar et al. | 360/98 |
| 4,385,333 | 5/1983 | Hasler | 360/97 |
| 4,419,701 | 12/1983 | Harrison et al. | 360/77 |
| 4,491,888 | 1/1985 | Brown et al. | 360/97 |
| 4,516,177 | 5/1985 | Moon et al. | 360/77 |

FOREIGN PATENT DOCUMENTS

| | | | |
|---|---|---|---|
| 0097363 | 1/1984 | European Pat. Off. | 360/135 |
| 2074364 | 10/1981 | United Kingdom | 360/71 |

OTHER PUBLICATIONS

IEEE Transactions on Magnetics vol. Mag-17, No. 6, Nov. 1981 pp. 2739-2741 A 2,000 Track/Inch Disk File Servo System Using a Magnetoresistive Head, R. L. Comstock et al.

Primary Examiner—George G. Stellar
Attorney, Agent, or Firm—Odin, Feldman & Pittleman

[57] ABSTRACT

A micro-Winchester disk drive system particularly suited to meet the demands of a portable computer system. The micro-Winchester disk is a Winchester disk of 85-100 mm in diameter. This disk drive system by virtue of its small size and vibration isolation is ideally suited for use in portable computer systems. The micro-Winchester disk drive system was developed to store data at a density of 600 tracks per inch utilizing open-loop positioning mechanism. This disk drive system provides fast access data storage for use with small business computers, terminals and microprocessor based systems, portable or otherwise, and many other areas where compact, rugged light-weight hard-disk storage is required. The disk drive system of the present invention normally utilizes either one or two hard disks such as Winchester disks and provides data storage on each disk in excess of 5 Megabytes, once the disks are formatted.

45 Claims, 16 Drawing Figures

MICRO HARD-DISK DRIVE SYSTEM

BACKGROUND OF THE INVENTION

The present invention relates to a hard disk drive system, in particular a micro-Winchester disk drive system.

With the rapidly expanding development of personal computers and desk top data processing systems, there has been a demand for increasing the performance of the disk drive systems of such computers. The major development in this direction has been the introduction of small Winchester disk drives as replacements and enhancements to floppy disk drives for program storage. The Winchester disk drive in general provides higher capacities and faster speeds of operation, factors which are important for the effective use of personal computers running advanced software packages.

The types of Winchester disk drives that have developed in this regard were based on the use of hard disks of diameter approximately 5¼ inch, also known as mini-Winchester disks, and this so called "5¼ inch" disk drive has generally developed as an "industry standard." Such a Winchester disk drive can store typically 5–30 Megabytes of information when designed around an open-loop positioning system using a stepper motor capable of supporting up to approximately 360 data tracks per inch. However, advances made by the assignee of the present invention have expanded the storage capacity of the typical 5¼ inch disk drive up to 600 tracks per inch using this same basic type of open-loop positioning system, a track density previously believed not to be obtainable with such a stepper motor technology.

More recently, portable personal computers have been introduced, and it is clearly a performance advantage if they can achieve a high degree of software compatibility with the desk top computing systems. Portability demands special requirements on the incorporation of a hard disk system, for example, light weight, low power consumption and particularly the capability of withstanding harsher shock and vibration conditions. However, software compatibility also demands performance parameters such as data storage capability comparable to those available on 5¼ inch mini-Winchester disk drive systems.

Among the various advances that have been made in the construction and operation of disk drive systems are those developments made by the assignee of the present application, Rodime PLC, which developments are set forth in the following U.S. patent and patent applications. The subject matter of such patent and patent applications is hereby incorporated by reference.

U.S. Pat. No. 4,392,095, entitled "Method of and Apparatus for Generating a Unique Index Mark From the Commutation Signal of a D.C. Brushless Motor" discloses a system for providing a unique index mark relative to the computer disk which is required for avoiding errors in addressing a memory location on the disk surface. This index mark is provided by correlating the commutation signal from a d.c. motor with a synchronizing signal present on one or more discrete tracks of the computer disk.

U.S. patent application Ser. No. 332,003, entitled "Read-Write Head Thermal Compensation System" discloses a thermal compensation system used by Rodime PLC in its 5¼ inch disk drive system. The positioning mechanism of this system is shown in FIG. 15 of the present application. This thermal compensation system uses different materials with different coefficients of thermal expansion for various components of the positioning mechanism for the read-write head used in the disk drive system. In the operation of this thermal compensation system, in response to a change in temperature a mispositioning of the read-write head is compensated for by a counter-movement due to the selection of various materials with different coefficients of thermal expansion within the mechanical arrangement.

U.S. patent application Ser. No. 388,165 entitled "Ventilation System for a Computer Disk Drive Hub Assembly" discloses a ventilation system for use in a computer disk drive which enables the disk file data storage capacity to be increased for a given volume of chamber housing the disk and improves the disk drive operating performance.

U.S. patent application Ser. No. 373,281 entitled "Method and Apparatus for Controlling a Stepper Motor" discloses a system for minimizing oscillations of the stepper motor for a single step, minimizing the time taken for the stepper motor to move between tracks for multi-track seek operations and reducing the angular hysteresis due to the mechanical and magnetic properties of the stepper motor construction. In controlling the operation of the stepper motor, a microprocessor circuit is adapted to drive the stepper motor in accordance with predetetermined programs.

SUMMARY OF THE INVENTION

An object of the present invention is to provide a compact micro hard-disk drive system having a high performance capability.

Another object of the present invention is to provide an improved hard disk drive system in which the size, weight, sensitivity to vibrations, power consumption and heat dissipation are minimized without sacrificing high performance capabilities thereby rendering the system particularly advantageous for use in portable computing systems.

Still another object of the present invention is to provide a micro-Winchester disk drive with an open-loop positioning system capable of providing performance parameters comparable to those of a 5¼ inch Winchester disk drive.

A further object of the present invention is to provide a micro-Winchester disk drive system that affords storage capacity of at least approximately 5 Megabytes per disk.

A still further object of the present invention is to provide a micro-Winchester disk drive system that is electrically compatible with 5¼ inch disk drives in its interface to computer systems.

A still further object of the present invention is to provide a micro hard-disk drive system in which the disk housing assembly is secured with a first set of anti-vibration mounts which isolates the housing against vibrational forces with substantial isolation in two orthogonal axes lying in a first plane.

It is still a further object of the present invention to provide a micro-Winchester disk drive system mounted within a frame having a second set of anti-vibration mounts that provide additional isolation with substantial further isolation in two orthogonal axes lying in a second plane orthogonal to the first plane.

Another object of the present invention is to provide a micro-Winchester disk drive system in which data is stored at a density of approximately 600 tracks per inch.

Still another object of the present invention is to provide a micro hard-disk drive system having a thermal compensation system which compensates for any misalignment of the read-write head positioningmechanism due to thermal effects.

The micro-Winchester disk drive system of the present invention was developed to provide a disk drive system particularly suited to meet the demands of a portable computer system. The terminology micro-Winchester disk refers to a Winchester disk of 85–100 mm in diameter, with the preferred embodiment being approximately 96 mm. A Winchester disk of this size can also be referred to as a 3½ inch" Winchester disk. The micro-Winchester disk drive system was developed to incorporate the 600 tracks per inch open loop positioning capability. This new disk drive system by virtue of its small size and vibration isolation is ideally suited for use in portable computer systems.

The disk drive system of the present invention is constructed for operating micro-Winchester computer disks. This disk drive system provides fast access data storage for use with small business computers, terminals and microprocessor based systems, portable or otherwise, and many other areas where compact, rugged light-weight hard-disk storage is required. The disk drive system of the present invention normally utilizes either one or two hard disks such as Winchester disks and provides data storage on each disk in excess of 5 Megabytes, once the disks are formatted. The system is capable of storing in excess of 6 Megabytes per disk with the disk unformatted.

Each of the hard-disks is mounted for rotation within the housing of the hard-disk drive system of the present invention. In accordance with the preferred embodiment, each of these hard-disks is 96 mm in diameter. A transducer, which includes two read/write heads for each disk within the system, one head positioned on each side of the disk, writes digital information on and reads digital information from the hard-disk. The disk drive system of the present invention operates so that such information is stored on the disk at a density of approximately 600 concentric tracks per inch. A positioning mechanism moves the transducer between the tracks on the computer disk for writing information on the disk and reading information from the disk.

The positioning mechanism of the disk drive system of the present invention is arranged for moving the transducer along a path extending in an approximately radial direction with respect to the hard-disk so that the transducer can move between the innermost and outermost tracks on the disk. The positioning means moves the transducer along an arcuate path that extends in the radial direction with respect to the disk.

The positioning mechanism of the disk drive system of the present invention includes a stepper motor and a mechanism for operating the stepper motor in full step increments. In the operation of the stepper motor, each step increment is approximately 0.9°. Each step movement of the stepper motor causes the transducer to move from one track to the next adjacent track. Each read-write head of the transducer is arranged on one end of a support arm, or flexure, which extends in a radial direction with respect to the computer disk. A positioning arm is attached to the other end of the support arm. The positioning arm has one end coupled to a pivot shaft for enabling the positioning arm to be pivoted about the axis of the pivot shaft. This pivot shaft is located on one side of the support arm and is spaced away from the support arm. The stepper motor has an output drive shaft for controlling the movement of the positioning arm. A tensioned steel band is coupled to the drive shaft of the stepper motor via a pulley and also is coupled both to the end of the positioning arm on the opposite side of the support arm from the pivot shaft and to a tensioning spring attached to the positioning arm. The steel band is connected in a pulley arrangement for coupling the drive shaft of the stepper motor to the positioning arm so that rotational movement of the stepper motor causes pivoting of the positioning arm about the pivot shaft. This pivoting movement of the positioning arm in turn moves the support arm and the transducer in incremental steps across the tracks of the disk.

The positioning arm is coupled directly to the pivot shaft which itself is free to rotate by way of a bearing assembly which includes a pair of ball bearings arranged in a back-to-back configuration with a dimensional pre-load of approximately 5 pounds force. The stepper motor that is used for driving the positioning arm is a two-phase bipolar stepper motor that operates in a full step mode. The tensioned steel band that interconnects the stepper motor to the positioning arm is a band etched from stainless steel with a tensile strength of greater than approximately 250,000 psi.

In constructing the positioning mechanism of the disk drive system of the present invention, the materials for each of the components are selected to automatically compensate for any mispositioning between the transducer and a track caused by thermal effects. The positioning mechanism includes a primary thermal loop that on average causes the transducer to move inwardly from a track center as temperature rises and a second thermal loop that causes a counter-movement thereby tending to maintain the transducer on track center.

In order to provide for such thermal compensation of the positioning mechanism in the disk drive system of the present invention, three different classes of materials are utilized. The positioning arm is formed of a first material. The disk and housing are formed of a second material. The pivot shaft, head support arm and metal band are formed of a third material. These first, second and third materials have different coefficients of thermal expansion. The arrangement, geometry and selection of materials of these parts are such that in response to a change in temperature of the various components of the positioning system react in such a way that the support arm effectively rotates via the positioning arm and the pivot shaft so as to maintain the transducer substantially at its original track position. Consequently, the positioning system self compensates for any movement that would be caused by changes in temperature.

The disk drive system of the present invention is a housing in which the micro hard-disk, the transducer and at least a portion of the positioning mechanism are contained. This housing is arranged within a first frame which holds the housing. A first set of anti-vibration mounts secures the housing within the frame so as to minimize the transmission of shock or vibration from the frame to the housing. This is substantially effective in two orthogonal directions lying in a first plane. In addition, this frame supporting the housing holding the disk drive system can be arranged within a second larger frame. In such a situation, the frame for the micro-Winchester disk drive system of the present invention can be held within a larger frame that would fit within an opening normally designed for holding either a regular 5¼ inch disk drive system or a 5¼ inch disk drive system with half the height dimension. If such a second frame is used, then a second set of anti-vibration mounts is provided for securing the first frame within the second larger frame so as to substantially prevent vibration of the housing in the third orthogonal axis as well as further reducing the vibration and shock transmission in the original two axes. Such an arrangement is particularly beneficial in portable computers which need to be sufficiently rugged to protect the relatively delicate Winchester disk drive against handling and transportation damage.

The electronics of the micro-Winchester disk drive system of the present invention have been developed utilizing integrated circuits with the entire control circuit being arranged on a single printed circuit board. Providing electronic functions of the drive on a single printed circuit board whose dimensions do not exceed the overall dimensions of the drive thus permitting full utilization of the systems of anti-vibration amounts has made it possible to meet the objectives for use of the micro-Winchester disk drive in portable computer systems. Further, the electronic functions have been implemented, in part, in several integrated circuit chips of different types with the objective of functioning with a minimum use of power. An additional novel feature in this regard is the use of a microprocessor routine which substantially reduces the power used by the stepper motor when the disk drive is de-selected by the host computer system. This 'power-save' capability and low average power consumption are desirable properties of a hard-disk drive when used in a portable computer system since they result in less heat dissipation thereby minimizing the requirement of the computer system to provide noisy and bulky air-extraction fans.

DESCRIPTION OF THE PREFERRED EMBODIMENTS

Figure 1:
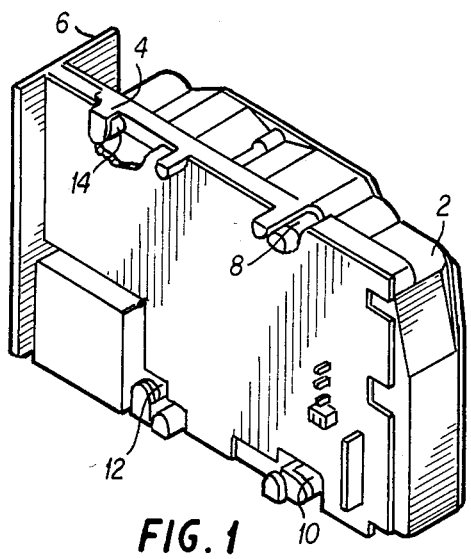
FIG. 1 is a side perspective view of the housing of the disk drive system of the present invention mounted within its first frame assemby.

A micro-Winchester disk drive system in accordance with the present invention is shown in FIG. 1. The disk drive system includes housing 2 which is mounted in turn within frame 4. Frame 4 is attached to face plate, or facia, 6. Face plate 6 with housing 2 and frame 4 may be slid into a slot provided within the computer for the disk drive system. In order to secure housing 2 and hence the internal operating members of the disk drive system against vibrational forces, a plurality of anti-vibration mounts 8, 10, 12 and 14 are provided.

Figure 2:
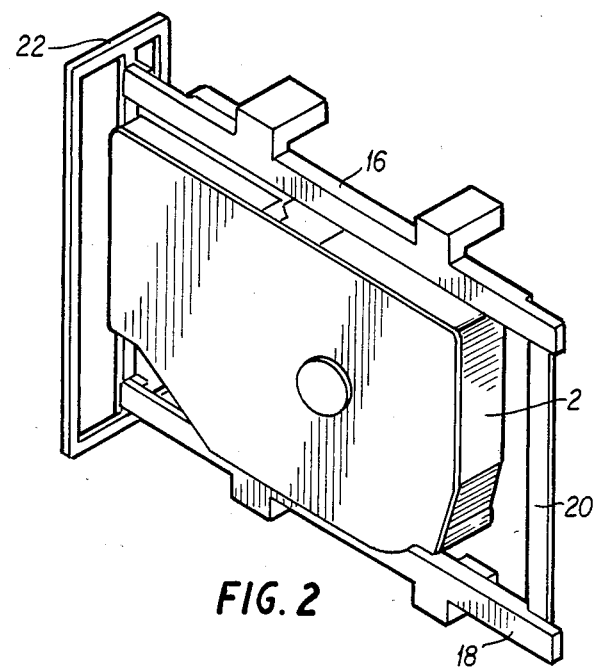
FIG. 2 is a side perspective view of the opposite side of the housing for the disk drive assembly of the present invention from the view of FIG. 1 with such housing and first frame being mounted within a second frame assembly.

It is possible to mount the micro-Winchester disk drive system of the present invention within a larger opening constructed for receiving a 5¼ inch disk drive system. In such an arrangement, as shown in FIG. 2, housing 2 with frame 4 is placed inside of a second frame. This second frame is formed by top frame member 16, bottom frame member 18 and a cross bar 20. The second frame is attached to face plate 22 and to the first frame 4. With such an arrangement, a second series of anti-vibration mounts can be provided between first and second frames for further isolating the disk drive system against shock and vibrational forces in directions both parallel and orthogonal to the direction of isolation provided by the first set of anti-vibration mounts. The preferred anti-vibration mount is model type AVM 206 supplied by AVA Ltd. of Surrey, England.

The disk drive system in accordance with the preferred embodiment of the present invention is a microprocessor-based device which receives and transmits MFM (modified frequency modulation) data, seeking the appropriate track in response to step commands across the disk control interface. The drive is soft sectored and is connected to the host system via a disk drive controller which is responsible for formatting, MFM encode and decode to NRZ, block address decode, CRC generation and verification and other functions. There are two embodiments containing 1 to 2 hard disks and respectively ranging in total data storage from 6.37 to 12.75 Megabytes. Typical format schemes with 256 data bytes per sector and 32 sectors per track can realize an efficiency of about 79% giving formatted capacities up to about 10 Megabytes.

The microprocessor is responsible for the control of the stepper motor used for head positioning. Fast seek times are achieved by the use of programmed velocity profiles and microstepped damping routines. Automatic thermal compensation has been built into the head positioning mechanism. A fail-safe dual-acting brake is provided as standard for the main d.c. disk motor and the stepper motor thereby increasing further the resistance of the drive to shock and vibration.

A summary of the important performance parameters is given below:

GENERAL PERFORMANCE

-continued

| | |
|---|---|
| Disks | 1,2 |
| Heads | 2,4 |
| Unformatted capacity (Megabytes) | 6.38, 12.75 |
| Formatted capacity (typical) | |
| Per drive (Megabytes) | 5.0, 10.0 |
| Per track (bytes) | 8192 |
| Per sector (bytes) | 256 |
| Sectors per track | 32 |
| Cylinders | 306 |
| Transfer rate (M bits/s) | 5 |
| Seek times (ms) (including settling) | |
| Track to track | 18 |
| Average | 85 |
| Maximum | 180 |
| Average latency (ms) | 8.3 |
| Flux reversals per inch (max) | 11,050 |
| Tracks per inch | 600 |
| Rotational speed (r.p.m.) | 3600 |

SHOCK & VIBRATION

| SHOCK | FIG. 1 Embodiment | FIG. 2 Embodiment | |
|---|---|---|---|
| Operating | 6 g | 12 g | All axes; |
| Non-Operating | 30 g | 40 g | ≦10 ms duration |

| VIBRATION | FIG. 1 - Embodiment | |
|---|---|---|
| Operating | 5 Hz to 16 Hz | 0.040" displacement peak-peak |
| | 16 Hz to 60 Hz | Interpolation at constant velocity (2 inch/s) |
| Non-Operating | 60 Hz to 500 Hz | 2 g peak acceleration |
| | 5 Hz to 16 Hz | 0.080" displacement |
| | 16 Hz to 60 Hz | Interpolation at constant velocity (4 inch/s) |
| | 60 Hz to 500 Hz | 4 g peak acceleration |
| | FIG. 2 - Embodiment | |
| Operating | 5 Hz to 16 Hz | 0.080" displacement |
| | 16 Hz to 60 Hz | Interpolation at constant velocity (4 inch/s) |
| | (In region 20 Hz to 35 Hz maximum allowed acceleration = 0.5 g peak) | |
| Non-Operating | 60 Hz to 500 Hz | 4 g peak acceleration |
| | 5 Hz to 16 Hz | 0.160" displacement |
| | 16 Hz to 60 Hz | Interpolation at constant velocity (8 inch/s) |
| | 60 Hz to 500 Hz | 8 g peak acceleration |

Figure 3:
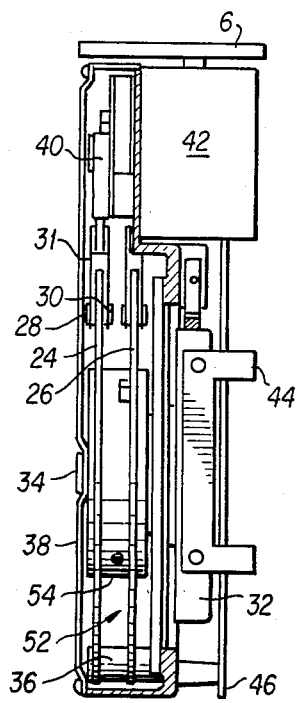
FIG. 3 is a sectional view of the disk drive system of the present invention.

A sectional view of the disk drive system of the present invention is shown in FIG. 3. In the system shown in this Figure, two micro-Winchester disks, 24 and 26, are arranged on the hub 54 of a d.c. motor 32 for rotation within the housing. Magnetic heads 28 and 30 are attached to support arms 31 which in turn are coupled to a stepper motor 42 through a drive band assembly 40 and positioning arm 41.

A breather filter 34 is provided on the top cover 38 of the disk housing 50 adjacent to the center of the spindle of the d.c. motor 32. A recirculating filter 36 is located inside the chamber 52 at one corner in a suitable position to filter the flow of air resulting from the pumping effect of the rotating disks when the disk drive is in operation. The top cover 38 seals the open face of the enclosure by means of a continuous gasket. An electronics board 46 is fixed to the base of the chamber 52 covering the full area (except for the stepper motor 42) of this face of the disk drive. The d.c. motor is fixed to the base of the chamber and is largely obscured from view by the electronics board.

Figure 4:
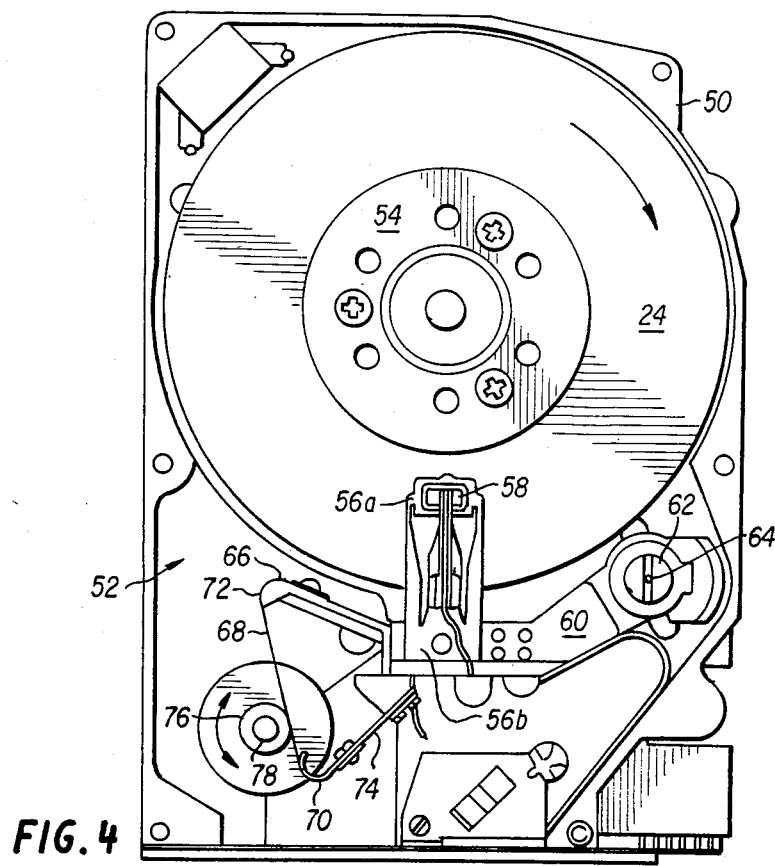
FIG. 4 is a plan view of the positioning system of the disk drive system of the present invention.
Figure 5:
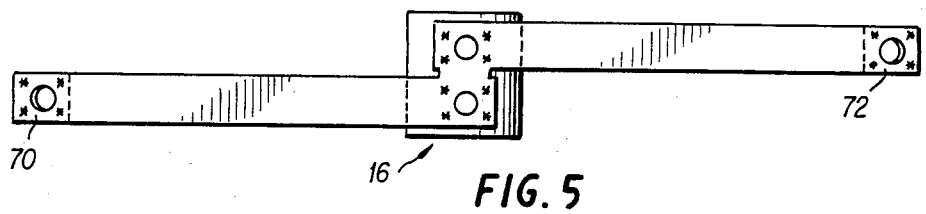
FIG. 5 is a plan view of the tensioning band used in the positioning system shown in FIG. 4.

The positioning mechanism is shown in greater detail in FIG. 4. This positioning mechanism is mounted on the base of housing 50 within chamber 52 of the disk drive system. Chamber 52 is formed by chamber housing 50 and top cover 38. Winchester disk 24 is mounted on a hub assembly 54 within chamber housing 52 so that it is rotated within the chamber by the d.c. motor 32.

The typical read/write magnetic head 58 is mounted on one end 56a of a flexure 56, which serves as the support arm. The other end 56b of flexure 56 is attached to a positioning arm 60. Flexure 56 is a thin rectangular stainless steel foil. Positioning arm 60 is coupled to a steel pivot shaft 62. The steel shaft 62 is fixed to the inner races of a pair of preloaded steel ball bearings (not shown) which in turn are located in the base of housing 50. Pivot shaft 62 rotates about pivot axis 64. The side of positioning arm 60 opposite from shaft 62 has a curved portion 66. In addition, a steel spring arm 74 is attached to positioning arm 60. A tensioned steel band 68 is wrapped around and attached to steel pulley 76 mounted on drive shaft 78 of the stepper motor. The stepper motor is fixed to the base of housing 50. The two ends of the steel band, 70 and 72, are attached to arms 74 and 66, respectively.

By appropriately selecting materials of different coefficients of thermal expansion for the various components of the positioning mechanism, it is possible to provide thermal compensation so as to ensure that the read/write heads remain on track irrespective of thermal effects. For such purposes, three different classes of materials are utilized, the first class of material is an aluminum/bronze alloy, the second class of material is stainless steel and the third class of material is aluminum. The principal components of the thermal compensation system and their preferred materials are: disk 24 (wrought aluminum); housing 50 (die cast aluminum alloy LM2); positioning arm 60 (aluminum/bronze alloy); metal band 68 (Sandvik 11 R 51 steel); and flexure support 56 (AISI 301 stainless steel). The dimensions and arrangement of these various components are such that in response to changes in temperature, the various materials expand or contract in such a way that the support arm (flexure) effectively rotates via the positioning arm and the pivot shaft so as to maintain the typical read/write head substantially at its original track position.

These are two thermal "circuits" effectively controlling the positioning of the read/write head 58 to a track on the disk 24 consisting of a primary thermal circuit and a compensating thermal circuit. The primary thermal circuit operates in chamber 52 and links the track on the disk 24 to the hub 54, to the motor 32, to the base of housing 50, to the bearings for shaft 62, to the shaft 62, to the arm 60, to the flexure 56, and to the read/write head 58. The compensating circuit also operates in chamber 52 and links the arm 60 to the band 68, to the pulley 76, to the stepper motor shaft 78, to the stepper motor, to the base of housing 50, to the bearings for shaft 62, to shaft 62 and to the arm 60. The primary thermal circuit and the compensating thermal circuit have arm 60, pivot shaft 62, housing 50 and the circulating air in chamber 52 in common.

In use, whenever there is a temperature change, the primary thermal circuit in chamber 52 results in a misposition of head 58 relative to a track on disk 24. However, the compensating circuit of the chamber 52 causes the shaft 62 to rotate in such a way as to substantially move the read/write head 58 to its original position relative to the disk. This operation is described more fully below.

A temperature change in chamber 52 causes the read/write head 58 to move relative to a track on the disk 24 because of varying contributions from flexure 56, housing 50 and positioning arm 60 in the primary thermal circuit. The resulting misposition varies according to track position (proportional to the angle of shaft 62 and arm 60 relative to the 'line' drawn between the center of the hub 54 and the shaft axis 64). As temperature rises the head on average mispositions inwardly from the track centerline.

The compensating thermal circuit in chamber 52 acts to reduce this misposition to acceptable proportions for all track positions. With temperature changes, the various components of the compensating circuit vary in length relative to each other and the change in geometry causes rotation of the arm 60 about the axis of the shaft 62, thus compensating for the read/write head 58 and disk 24 misposition over the prescribed track positions and temperature range of the disk drive.

Figure 6:
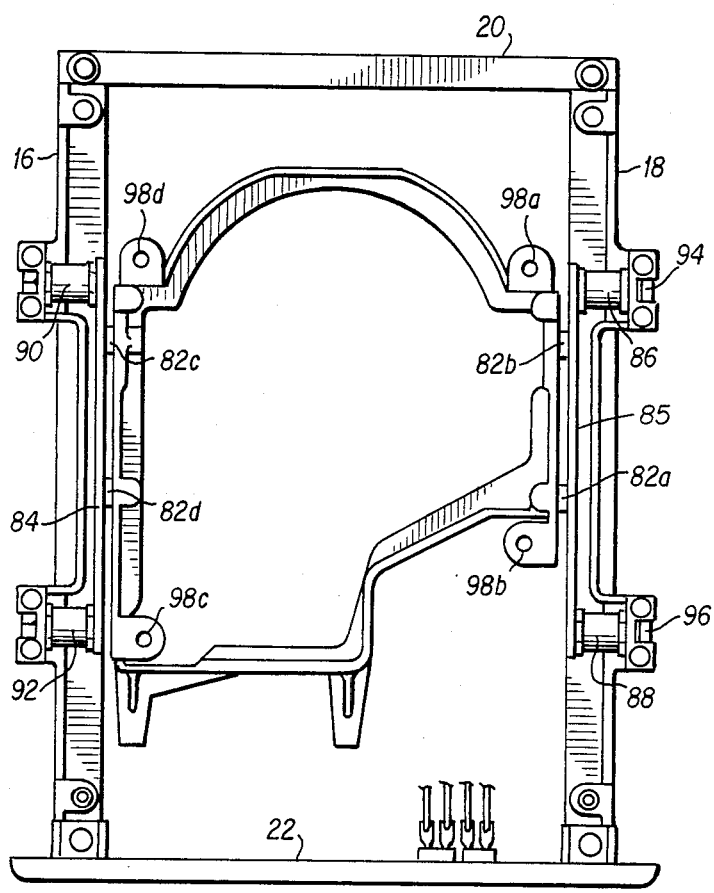
FIG. 6 is a plan view of a portion of the mounting assembly shown in FIG. 2 for the disk drive system of the present invention.
Figure 7:
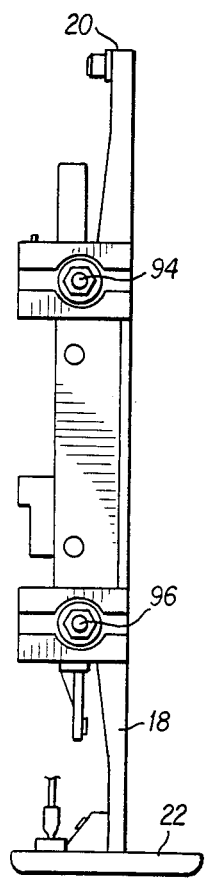
FIG. 7 is a top end view of the mounting assembly shown in FIG. 2 for the disk drive system of the present invention.

As indicated above, the disk drive system 2 within frame 4 can be mounted within a second frame formed by frame members 16 and 18 and cross bar 20. This arrangement showing both frames is given in greater detail in FIGS. 6 and 7. This second frame supports the disk drive system using adapter plates 84 and 85. The adapter plates are used for interconnecting the first and second frames. The adapter plates are attached to the first frame by screws and washers 82a, 82b, 82c and 82d. The adapter plates are connected to frame members 16 and 18 by four anti-vibration mounts, 86, 88, 90 and 92. As shown in FIG. 7, the anti-vibration mounts are connected by nuts 94 and 96 to the frame member 18 and a similar type of connection would be made of the anti-vibration mounts to frame member 16. The first set of anti-vibration mounts 18, 10, 12 and 14, connecting frame 4 to housing 50, which are shown in FIG. 1, are connected to holes 98a. 98b, 98c and 98d on first frame 4. This overall arrangement provides for exceptional shock and vibration isolation due to the inclusion of the double anti-vibration mounts that are mounted in perpendicular axes relative to each other. The first set of anti-vibration mounts primarily isolates the disk drive system in a first plane while the second set isolates the system in a second orthogonal plane.

The d.c. motor 32 is a brushless 2-phase external rotor d.c. motor with integral hub and commutation effected by a Hall sensor. A spare Hall sensor is provided in each motor. The motor uses preloaded ABEC 7 bearings and is balanced in two planes to better than 0.25 gm cm. A ferrofluidic seal is fitted above the top bearing. The disk hub 54 is grounded to the electronics board via the motor shaft and a button contact to prevent build-up of static charge on the rotating disks.

A dual brake/lock which is a plunger solenoid with a lever is provided to stop the disk drive motor in less than 5 seconds, to provide a restraining torque during handling and to lock the positioner assembly thereby restricting head movement across the disk surfaces.

Figure 16:
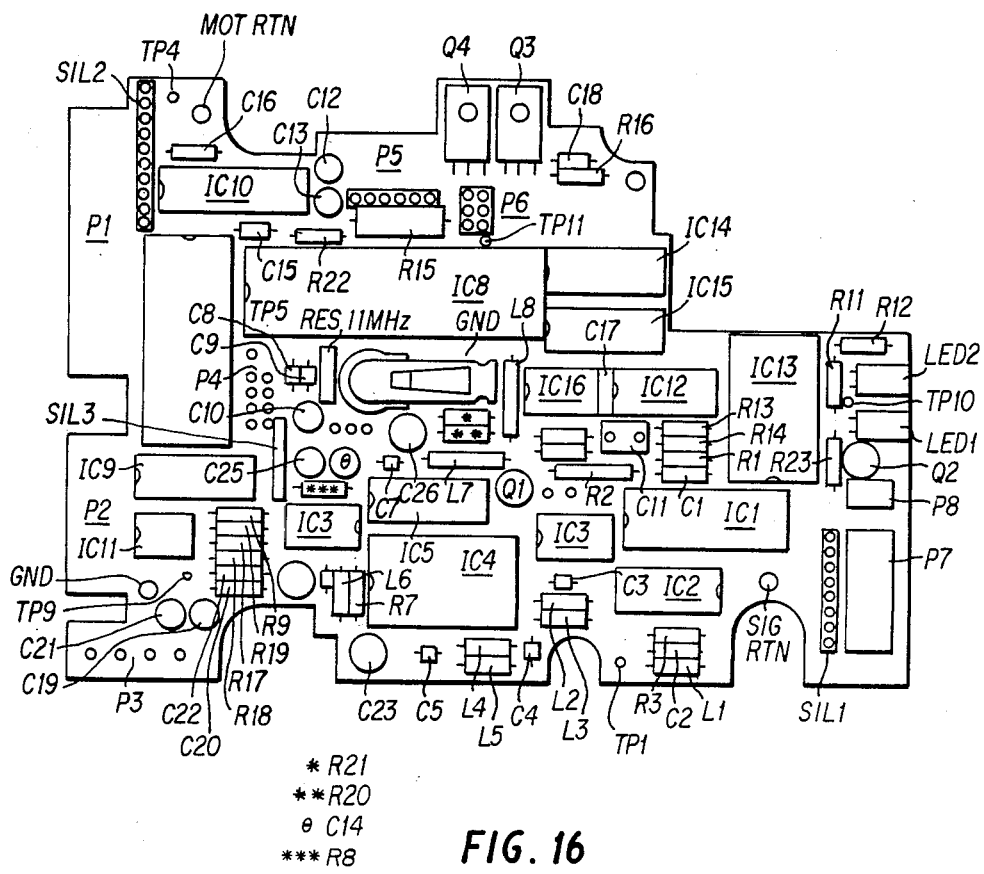
FIG. 16 is a diagram of an embodiment of a print circuit board for use of the disk drive of the present invention.

In developing the electronics for the micro-Winchester disk drive system of the present invention, the electronic circuits were designed primarily as integrated circuits that are placed on a single printed circuit board as shown in FIG. 16. The use of only a single printed circuit board whose dimensions lie within the outline dimensions of the housing 50 is particularly beneficial in enabling the dual anti-vibration mounting arrangement of the present invention to be utilized for mounting the micro-Winchester disk drive system in the space normally provided for a 5¼ inch disk drive system. Consequently an extremely rugged low weight hard-disk drive system is provided for use in a portable computer.

The development of the single printed circuit board electronic control circuit in the micro-Winchester disk drive system has enabled the power consumption and dissipation to be significantly reduced. For example, the electronic circuits in the preferred embodiment provides heat dissipation at a rate of between 8 and 12 watts as compared to 25 watts typically dissipated by a 5¼ inch Winchester disk drive system. Thus, the miro-Winchester disk drive system dissipates a relatively small amount of heat in the computer system. This enables a portable computer either to utilize a smaller fan or to eliminate the use of a fan for removing heat from the system.

Figure 8:
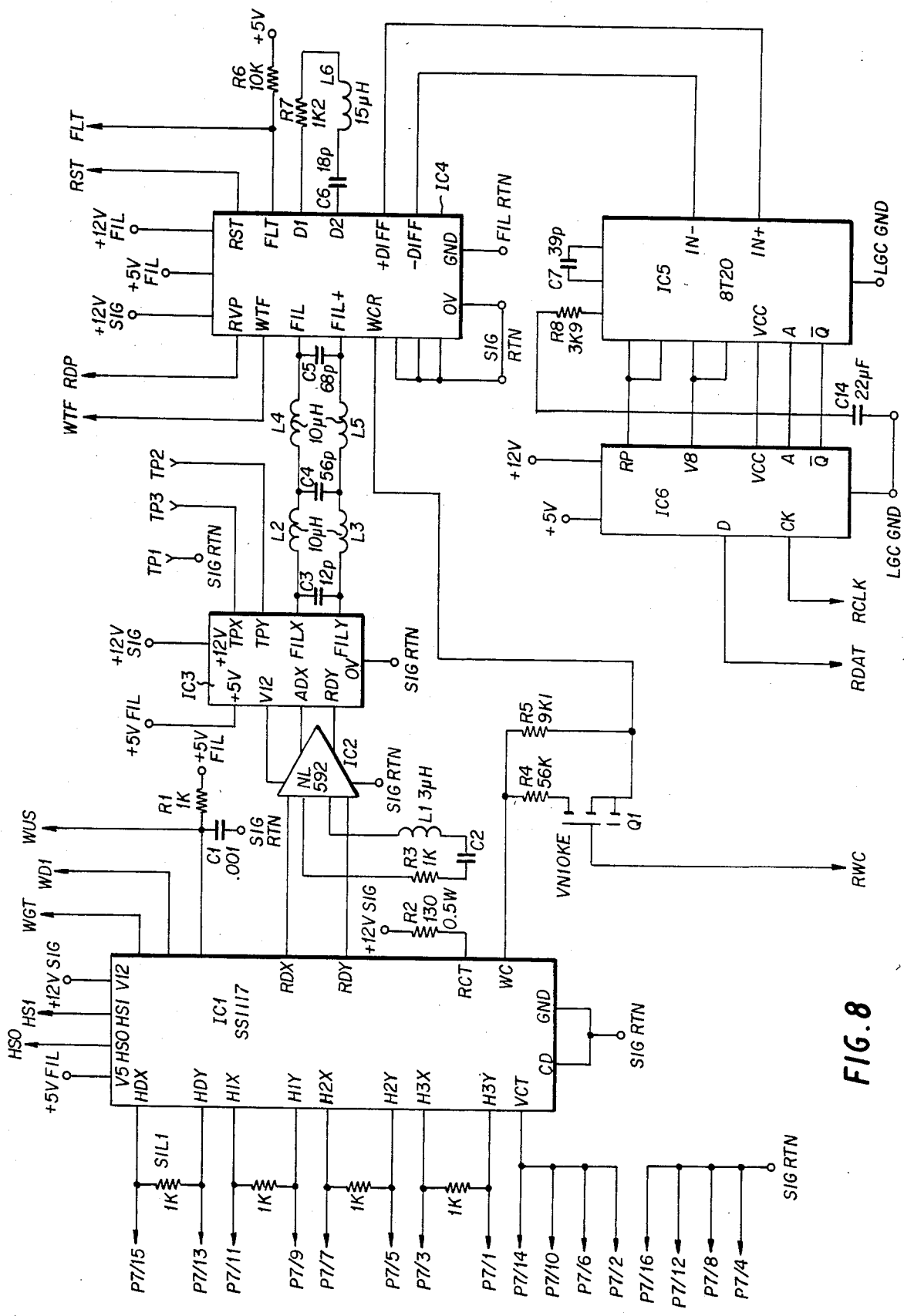
FIGS. 8, 9 and 10 are schematic circuit diagrams for the control circuit for the disk drive system of the present invention.
Figure 9:
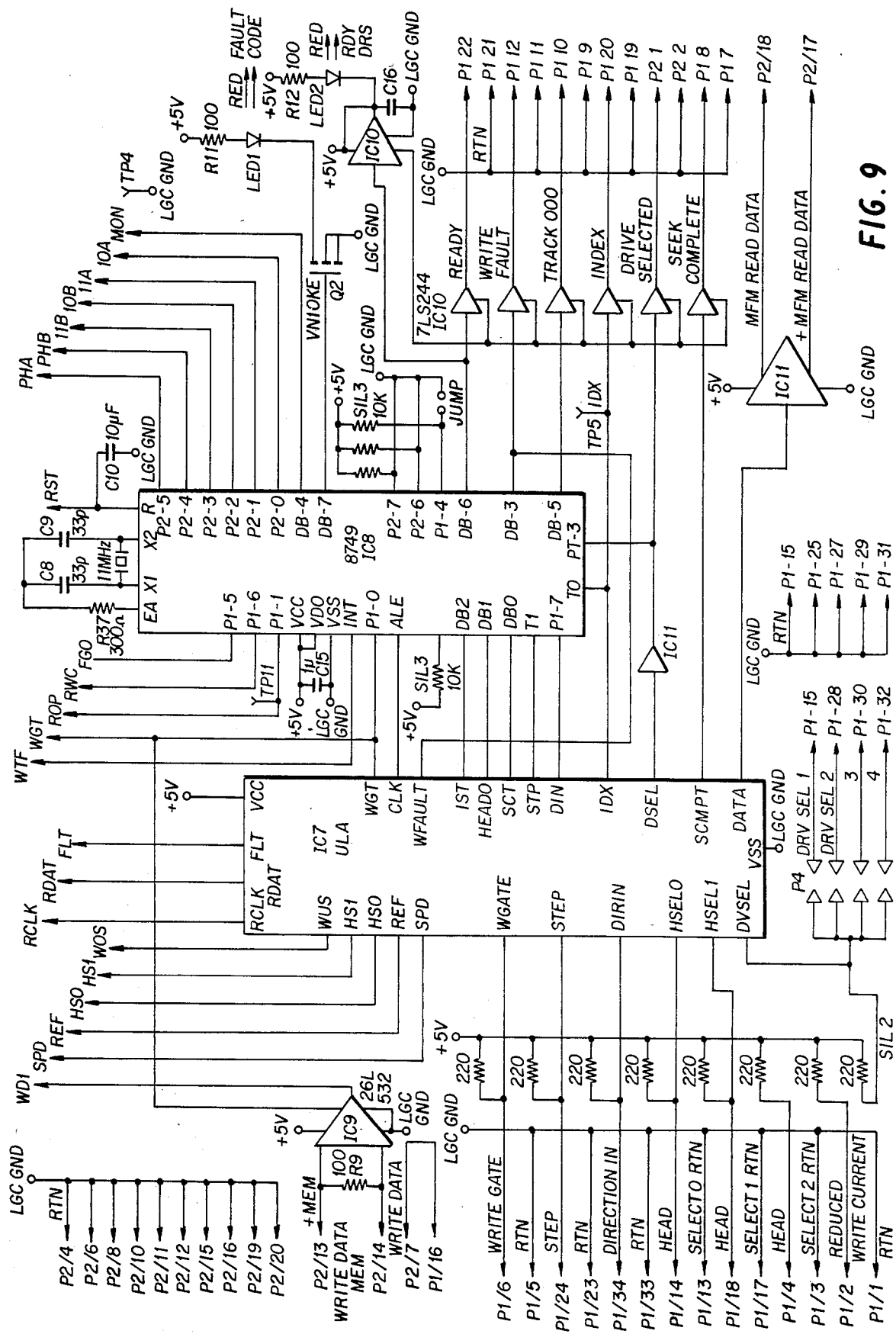
Figure 10:
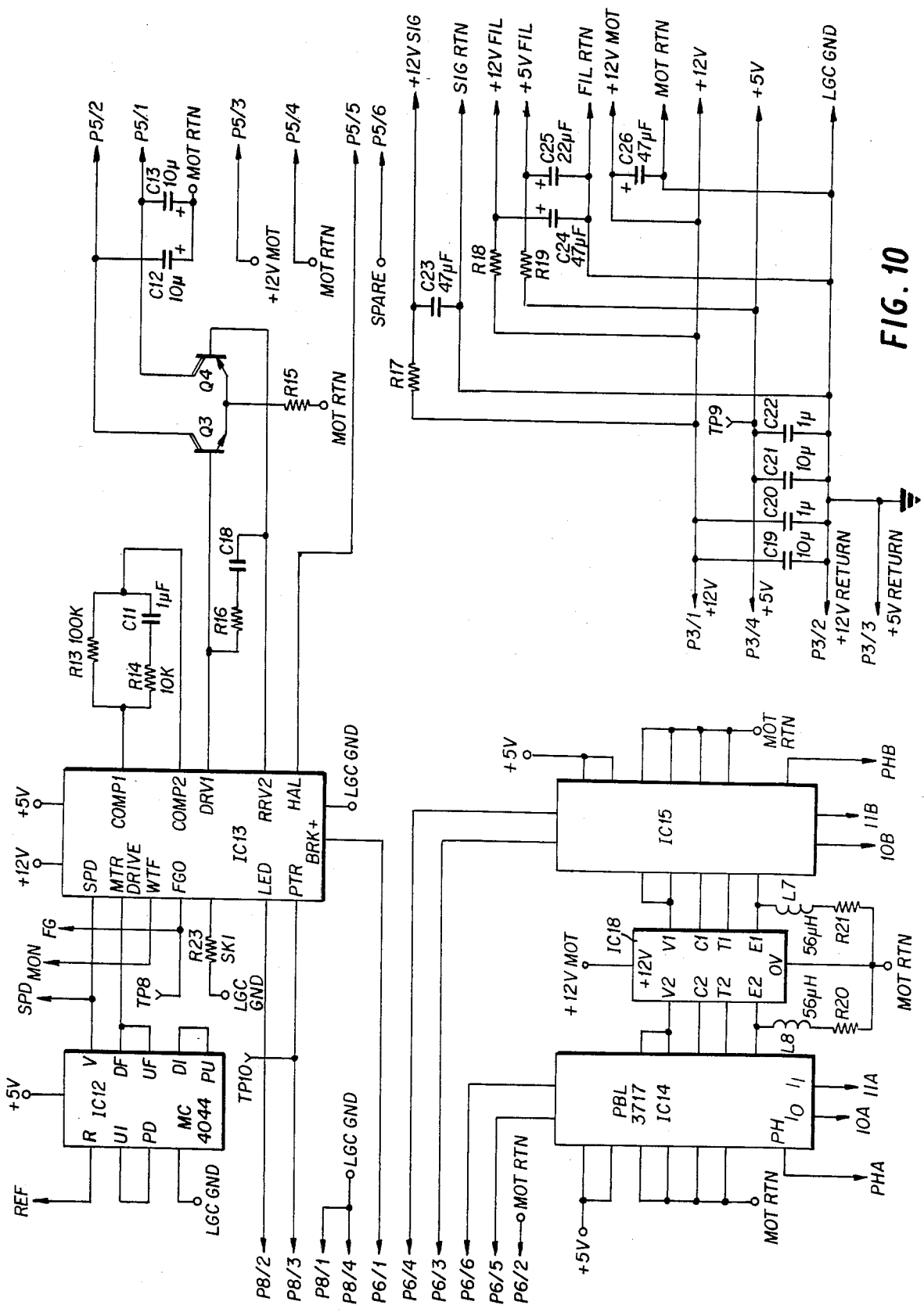

The electronic control circuits for the disk drive system are shown by the schematic diagrams in FIGS. 8, 9 and 10. These diagrams are described below.

Read and write data from the read/write heads 58 are differentially connected to the electronics board via connector P7. The resistor pack SIL1 contains damping resistors for the write current. The front end read and write circuitry is contained in IC1 (22-pin SSI (Silicon System Inc.) 117). This IC1 chip provides head readback voltage amplification with a differential gain of 100 as well as controlling head selection, write transitions, write current amplitude and fault conditions.

In the write mode, the IC1 chip functions as a differential current switch, with write current being set internally by choice of external resistor, R5. Reduced write current is effected by means of FET Q1 together with resistor R4 and this action is controlled solely by the microprocessor, IC8. Interface commands on the 'Reduced Write Current' line are ignored. Write data from the host computer are received on the lines±MFM WRITE DATA and are fed to IC1/20 via the line receiver IC9. All digital inputs to IC1 are TTL compatible.

Amplified read data from IC1 are differentially received on lines RDX, RDY. A further stage of amplification occurs in the video amplifier IC2 and the d.c. bias level is reset in IC3. Components C3, C4, C5, L2, L3, L4, L5 form a fifth order low pass Butterworth filter. IC4 contains a second 592 configured as a differentiator thus transforming the peaks of readback signals to zero-crossings which are then passed to IC5, which contains both a zero-crossing detector and digital filter. DC levels for IC5 are set by IC6. The digital pulse train is then shaped in IC7 (ULA) and passed to the line driver IC11 (9638) for driving across the interface.

The majority of interface receivers are located in IC7 (ULA). Output lines are driven by IC10. SEEK COMPLETE, TRACK ZERO and READY are generated by the 8049 microprocessor. INDEX is derived by dividing the output of a Hall sensor in the d.c. motor, since 2 pulses occur per revolution of the motor. The width of the index pulse is set to approximately 175 $\mu$s.

The speed control circuit for the d.c. motor is based on a phase-locked loop technique which derives its reference from the 11 MHz processor clock. Overall, a speed variation better than 0.1% is achieved.

Figure 14:
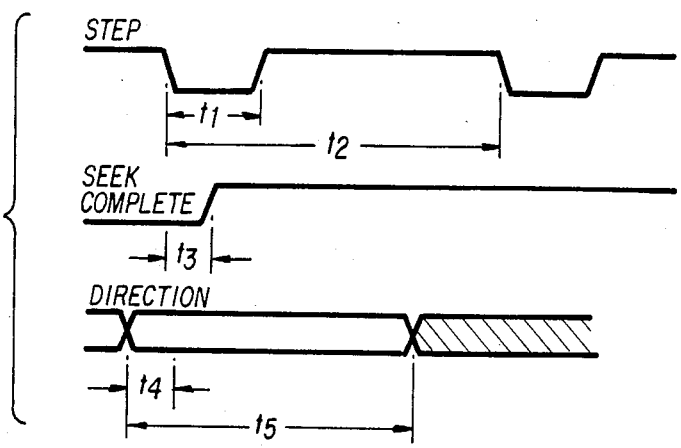
FIG. 14 is a step pulse timing diagram for the control of the stepper motor of the disk drive system of the present invention.
Figure 15:
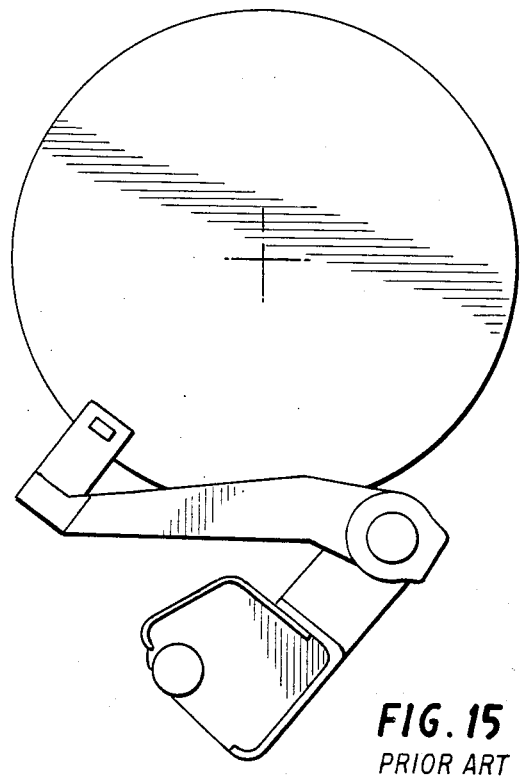
FIG. 15 is a schematic diagram of the positioning mechanism used in the Rodime 5¼ inch disk drive system.

The stepper motor is a bipolar two phase motor controlled by the microprocessor through IC14, IC15, IC16, L7, L8, R20 and R21. Chips IC14, IC15 are both RIFA PBL 3717 which provide a constant current to each motor phase by a chopping process. Chopper timing parameters are fixed by IC16. The timing for step pulses received across the interface is shown in FIG. 14. The following defines the labels in FIG. 14:

| Label Description | Min | Typ | Max | Units |
|---|---|---|---|---|
| t₁ Width of Step pulse | 0.5 | 5 | | μs |
| t₂ Time between Step pulses | 5 | | 15000 | μs |
| t₃ Time from first Step to Seek Complete False | | | 40 | μs |
| t₄ Direction set to first Step | 0 | | | ns |
| t₅ First Step to direction change (for overlap seek) | 150 | | | μs |

The microprocessor used on the drive is a member of the 8049 family of single-chip processors. The 8049 is used in the stand alone mode with no external memory and the 8049 in this mode has 2K bytes of program memory, 128 bytes of RAM and 24 I/O lines. It is driven by an 11 MHz crystal which gives a 1.36 μs instruction time.

The microprocessor has three main functions: stepper motor control; power-on auto-recalibration; status and fault monitor. It also indirectly controls the d.c. drive motor.

The stepper motor control function is described below. The following interface signals are used to control the stepper motor:

STEP. This input signal is used in conjunction with DIRECTION IN to move the stepper motor. It is connected to the 8049 T1 pin. This is a special input to the microprocessor which is used to clock an internal 9 bit counter. This counter is reset prior to each seek. Once the first STEP pulse is received the processor issues stepper motor phase changes until the number of changes equals the value in the counter. At this point the seek is terminated and SEEK COMPLETE is set true after final step damping.

DIRECTION IN. This input is connected directly to an I/O pin of the microprocessor. It defines the direction of motion of the stepper motor. Once the first STEP of any seek has been received the microprocessor samples this input and internally stores the result. The input is then ignored until the next seek.

SEEK COMPLETE. This status line is driven by a S-R flip-flop. STEP resets the flip-flop false. It is set true with an output from the microprocessor.

A two phase bipolar stepper motor is used to control the read/write heads. The motor is full stepped in a four step sequence. Two outputs from the processor are used to control switches for each winding. A further four outputs are used to microstep the motor thus improving the damping characteristics of the motor.

The microprocessor always buffers step pulses from the interface to the stepper motor. There are two seek modes, ramped and unramped. The interface step rate determines the seek mode automatically. In the ramped mode of operation the microprocessor accelerates the stepper motor to a maximum step rate of 2500 steps/sec, then decelerates to the requested track. For all seeks the last phase change to the stepper motor is different to all others in order to achieve the correct settling characteristics.

Figure 11:
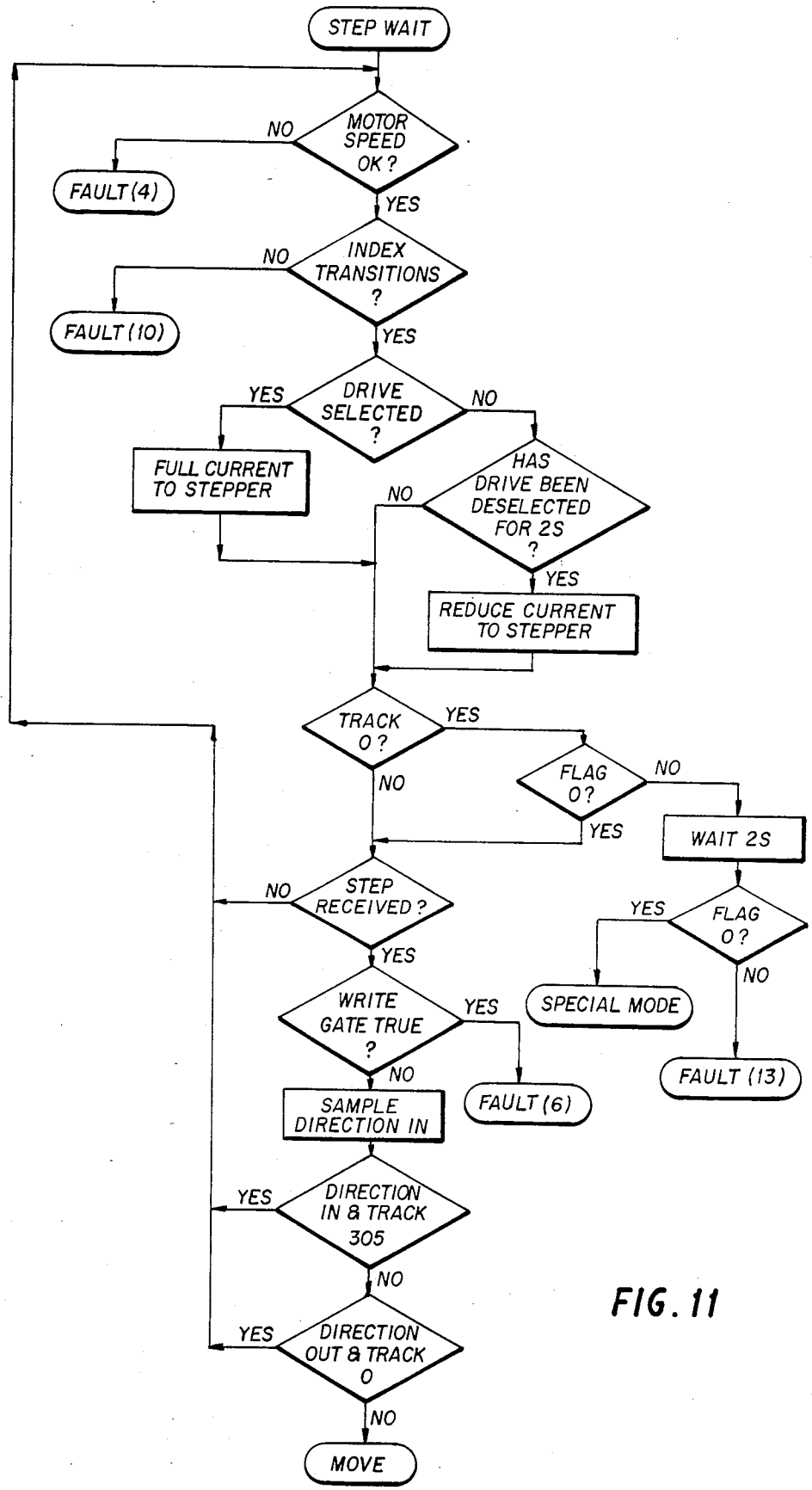
FIGS. 11, 12, and 13 are flow charts for the computer program for driving the stepper motor of the disk drive system of the present invention.
Figures 12, 13:
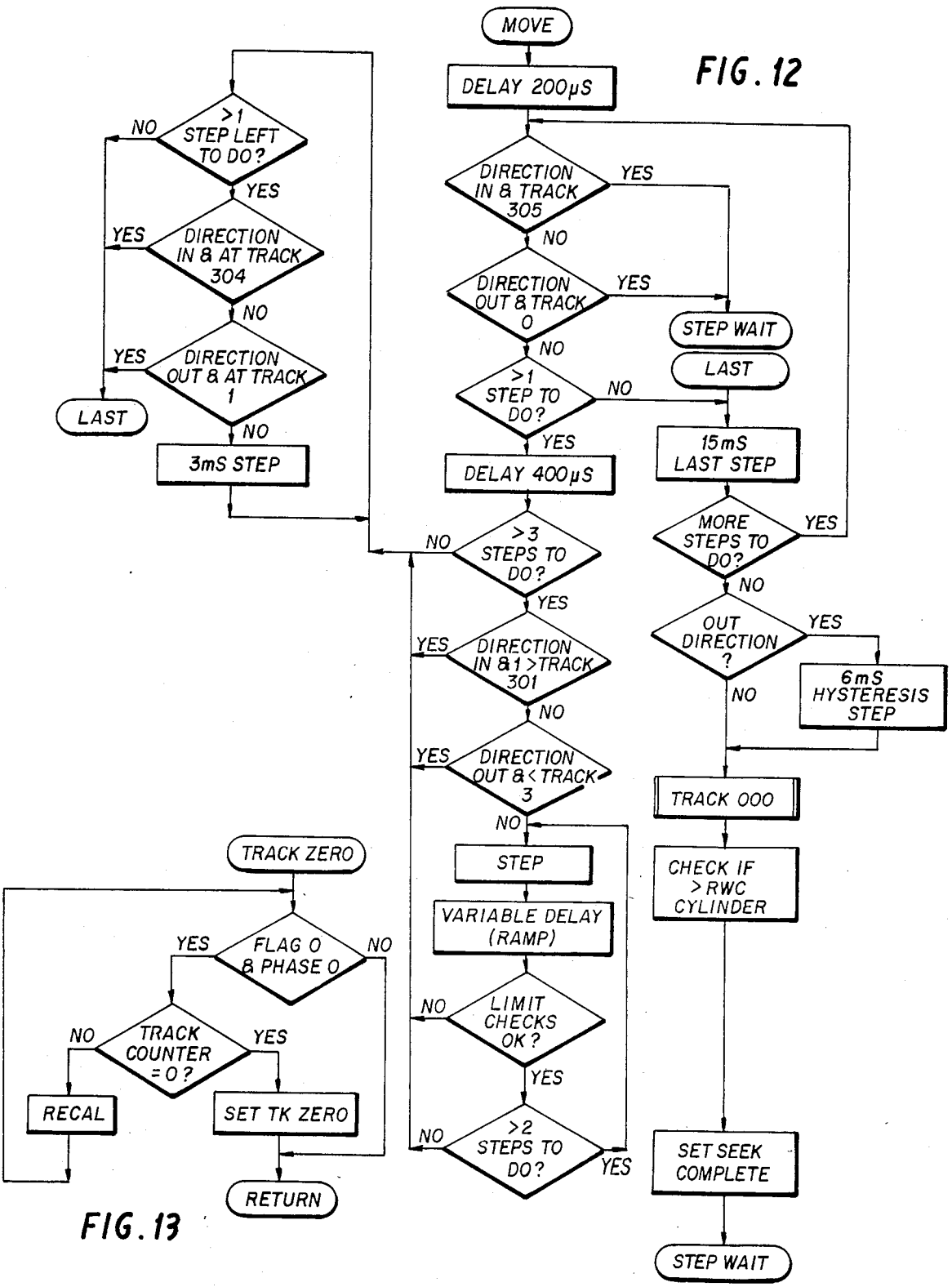

The flow chart for the STEP operation is shown in FIGS. 11, 12 and 13.

When the drive is de-selected for a period exceeding 2 seconds, the microprocessor causes the stepper motor current to reduce to approximately one-fifth of its normal value, a saving of 4 watts. The overall average saving in drive power consumption will depend on the select/de-select duty cycle. Recovery on re-selection is instantaneous i.e., the drive may write, read, or seek to a different track immediately on re-selection.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

What is claimed is:

1. A computer disk drive system for operating a micro hard-disk, said disk drive system comprising:
   at least one micro hard-disk;
   means for rotatably supporting said micro hard-disk;
   means for rotating said hard-disk;
   transducer means for writing digital information on and reading digital information from said hard-disk in a format so that said hard-disk has digital information stored at a density of approximately 600 concentric tracks per inch; and,
   open-loop positioning means for moving said transducer means between the tracks on said hard-disk, said positioning means including a stepper motor and means for operating said stepper motor in full step increments with each step increment being 0.9°, which increment causes said transducer means to move from one track to the next adjacent track on said hard-disk.

2. A disk drive system according to claim 1 wherein said positioning means is pivotably arranged for moving said transducer means along a path extending in an approximately radial direction with respect to said hard-disk so that said transducer means can move between the innermost and outermost tracks on said hard-disk.

3. A disk drive system according to claim 2 wherein said positioning means moves said transducer means along an arcuate path extending in a radial direction with respect to said hard-disk.

4. A disk drive system according to claim 2 wherein said positioning means includes a support arm arranged to extend in a radial direction with respect to said hard-disk and supporting said transducer means with said transducer means being mounted at one end of said support arm, a pivot shaft, and a positioning arm attached to the other end of said support arm and having one end thereof coupled to said pivot shaft for enabling said positioning arm to be pivoted about the axis of said pivot shaft, said pivot shaft being located on one side of said support arm and spaced away from said support arm.

5. A disk drive system according to claim 4 wherein said positioning means further includes:
   a bearing assembly coupled to said pivot shaft to which said positioning arm is coupled;
   a stepper motor having an output drive shaft;
   a tensioned steel band coupled to said drive shaft of said stepper motor and coupled to said positioning arm at the end of said positioning arm on the opposite side of said support arm from said pivot shaft; and,
   said band being arranged in a pulley arrangement for coupling said drive shaft of said stepper motor with said positioning arm so that rotational movement of said stepper motor causes pivoting of said positioning arm about said pivot shaft for moving said support arm and said transducer means in incremental steps across the tracks of said hard-disk.

6. A disk drive system according to claim 5 wherein said stepper motor is a two-phase bipolar stepper motor and operates in a full step mode.

7. A disk drive system according to claim 5 wherein said bearing assembly includes a pair of ball bearings arranged in a back-to-back configuration with a dimensional pre-load of approximately 5 pounds force and said tensioned steel band is a band of stainless steel with a tensile strength of greater than approximately 250,000 psi.

8. A disk drive system according to claim 5 wherein said positioning means is formed of selected materials for automatically compensating for any mispositioning arising from thermal effects between said transducer means and a track on said hard-disk.

9. A disk drive system according to claim 8 wherein said positioning means includes a primary thermal loop that causes said transducer means on average to move outwardly from a track center as temperature rises and a compensating thermal loop that causes a counter-movement thereby tending to maintain said transducer means on track center.

10. A disk drive system according to claim 8 wherein: said positioning arm is formed of a first class of material; said hard-disk and housing of said disk drive system are formed of a second class of material; said support arm, said pivot shaft and said tensioned band are formed of a third class of material; said first class of material, said second class of material and said third class of materials have different coefficients of thermal expansions; and the arrangement of these parts being such that in response to a change in temperature, these various components of said positioning mechanism react in such a way that said support arm effectively rotates via said positioning arm and said pivot shaft so as to maintain said transducer means substantially at its original track position.

11. A computer disk drive system for operating a micro hard-disk, said disk drive system comprising:
at least one micro hard-disk;
means for rotatably supporting said micro hard-disk;
means for rotating said hard-disk;
transducer means for writing digital information on and reading digital information from said hard-disk in a format so that said hard-disk has digital information stored at a density of approximately 600 concentric tracks per inch; and,
open-loop positioning means for moving said transducer means between the tracks on said hard-disk, said positioning means being formed of selected materials for compensating for any mispositioning arising from thermal effects between said transducer means and a track on said hard-disk.

12. A disk drive system according to claim 11 wherein said positioning means includes a primary thermal loop that causes said transducer means on average to move outwardly from a track center as temperature rises and a compensating thermal loop that causes a counter-movement thereby tending to maintain said transducer means on track center.

13. A positioning mechanism for positioning a read/write head for use in a disk drive assembly for reading data from and writing data on a hard-disk, said positioning mechanism comprising:
a support arm arranged to extend in an approximately radial direction with respect to the hard-disk and supporting the read/write head with the read/write head being mounted at one end of said support arm;
a pivot shaft;
a positioning arm attached to the other end of said support arm and having one end thereof coupled to said pivot shaft for enabling said positioning arm to be pivoted about the axis of said pivot shaft, said pivot shaft being located on one side of said support arm and spaced away from said support arm;
a bearing assembly coupled to said pivot shaft to which said positioning arm is coupled;
a stepper motor having an output drive shaft;
a tensioned steel band coupled to said drive shaft of said stepper motor and coupled to said positioning arm at the end of said positioning arm on the opposite side of said support arm from said pivot shaft and said band being arranged in a pulley arrangement for coupling said drive shaft of said stepper motor with said positioning arm so that rotational movement of said stepper motor causes pivoting of said positioning arm about said pivot shaft for moving said support arm and the read/write head in incremental steps across the tracks of the hard-disk; and
wherein said positioning means is formed of selected materials for automatically compensating for any mispositioning arising from thermal effects between said transducer means and a track on the hard-disk.

14. A disk drive system according to claim 13 wherein said stepper motor is a two-phase bipolar stepper motor and operates in a full step mode.

15. A disk drive system according to claim 13 wherein said bearing assembly includes a pair of ball bearings arranged in a back-to-back configuration with a dimensional pre-load of approximately 5 pounds force and said steel band is a band of stainless steel with a tensile strength of greater than approximately 250,000 psi.

16. A disk drive system according to claim 13 wherein said positioning means includes a primary thermal loop that causes said transducer means on average to move outwardly from a track center as temperature rises and a compensating thermal loop that causes a counter-movement thereby tending to maintain said transducer means on track center.

17. A disk drive system according to claim 13 wherein: said positioning arm is formed of a first class of material; said hard-disk and housing of said disk drive system are formed of a second class of material; said support arm, said pivot shaft and said tensioned band are formed of a third class of material; said first class of material, said second class of material and said third class of material have different coefficients of thermal expansions; and the arrangement of these parts being such that in response to a change in temperature, these various components of said positioning mechanism react in such a way that said support arm effectively rotates via said positioning arm and said pivot shaft so as to maintain said transducer means substantially at its original track position.

18. A computer disk drive system for operating a micro hard-disk, said disk drive system comprising:
at least one micro hard-disk;
means for rotatably supporting at least one said hard-disk;
means for rotating said hard-disk;

transducer means having two read/write heads for writing digital information on and reading digital information from said hard-disk on both planar sides of said hard-disk in a format so that said hard-disk has digital information stored at a density of approximately 600 concentric tracks per inch; and, positioning means for moving said transducer means between the tracks on said hard-disk, said positioning means including a stepper motor and means for operating said stepper motor in full step increments with each step increment being 0.9° which increment causes said transducer means to move from one track to the next adjacent track on said hard-disk.

19. A disk drive system according to claim 18 further comprising two micro hard-disks mounted on said means for rotatably supporting said hard-disks and said disk drive system operates so that each of said hard-disks is capable of storing at least 5 Megabytes of information.

20. A disk drive system according to claim 19 wherein said positioning means is pivotably arranged for moving said transducer means along a path extending in an approximately radial direction with respect to said hard-disks so that said transducer means can move between the innermost and outermost tracks on said hard-disks.

21. A disk drive system according to claim 20 wherein said positioning means moves said transducer means along an arcuate path extending in a radial direction with respect to said hard-disks.

22. A disk drive system according to claim 20 wherein said positioning means includes a support arm arranged to extend in a radial direction with respect to said hard-disks and supporting said transducer means with said read/write heads of said transducer means being mounted at one end of said support arm; a pivot shaft; and a positioning arm attached to the other end of said support arm and having one end thereof coupled to said pivot shaft for enabling said positioning arm to be pivoted about the axis of said pivot shaft; said pivot shaft being located on one side of said support arm and spaced away from said support arm.

23. A disk drive system according to claim 22 wherein said positioning means further includes:
   a bearing assembly coupled to said pivot shaft to which said positioning arm is coupled;
   a stepper motor having an output drive shaft;
   a tensioned steel band coupled to said drive shaft of said stepper motor and coupled to said positioning arm at the end of said positioning arm on the opposite side of said support arm from said pivot shaft; and,
   said band being arranged in a pulley arrangement for coupling said drive shaft of said stepper motor with said positioning arm so that rotational movement of said stepper motor causes pivoting of said positioning arm about said pivot shaft for moving said support arm and said transducer means in incremental steps across the tracks of said hard-disks.

24. A disk drive system according to claim 23 wherein said stepper motor is a two-phase bipolar stepper motor and operates in a full step mode.

25. A disk drive system according to claim 23 wherein said bearing assembly includes a pair of ball bearings arranged in a back-to-back configuration with a dimensional pre-load of approximately 5 pounds force and said tensioned steel band is a band of stainless steel with a tensile strength of greater than approximately 250,000 psi.

26. A disk drive system according to claim 23 wherein said positioning means is formed of selected materials for automatically compensating for any mispositioning arising from thermal effects between said transducer means and a track on said hard-disks.

27. A disk drive system according to claim 26 wherein said positioning means includes a primary thermal loop that causes said transducer means on average to move outwardly from a track center as temperature rises and a compensating thermal loop that causes a counter-movement thereby tending to maintain said transducer means on track center.

28. A disk drive system according to claim 26 wherein: said positioning arm is formed of a first class of material; said hard-disks and housing of said disk drive system are formed of a second class of material; said support arm, said pivot shaft and said tensioned band are formed of a third class of material; said first class of material, said second class of material and said third class of material have different coefficients of thermal expansions; and the arrangement of these parts being such that in response to a change in temperature, these various components of said positioning mechanism react in such a way that said support arm effectively rotates via said positioning arm and said pivot shaft so as to maintain said transducer means substantially at its original track position.

29. A disk drive system according to claim 20 wherein said positioning means is formed of selected materials for automatically compensating for any mispositioning arising from thermal effects between said transducer means and a track on said hard-disks.

30. A disk drive system according to claim 29 wherein said positioning means includes a primary thermal loop that causes said transducer means on average to move outwardly from a track center as temperature rises and a compensating thermal loop that causes a counter-movement thereby tending to maintain said transducer means on track center.

31. A disk drive system according to claim 20 further comprising: a housing in which said hard-disks, said transducer means and at least a portion of said positioning means are contained; a first frame for holding said housing; said first anti-vibration means securing said housing within said first frame so as to substantially prevent vibration of said housing within said first frame in a first plane.

32. A disk drive assembly according to claim 31 further comprising: a second frame in which said first frame is mounted and second anti-vibration means for use in securing said first frame within said second frame so as to substantially prevent vibration of said housing in a second plane with such second plane being perpendicular to the first plane of said first anti-vibration means.

33. A computer Winchester disk drive system for operating a micro-Winchester disk, said disk drive system comprising:
   at least one micro-Winchester disk having a diameter of approximately 96 mm;
   means for rotatably supporting said micro-Winchester disk;
   means for rotating said micro-Winchester disk;
   transducer means for writing digital information on and reading digital information from said micro-Winchester disk in a format so that said micro-Winchester disk has digital information stored at a density of approximately 600 concentric tracks per inch; and, open-loop positioning means for moving said transducer means between the tracks on said micro-Winchester disk, said positioning means including a stepper motor and means for operating said stepper motor in full step increments with each step increment being 0.9° which increment causes said transducer means to move from one track to the next adjacent track.

34. A disk drive system according to claim 33 further comprising: a housing in which the hard-disk, said transducer means and at least a portion of said positioning means are contained; a first frame for holding said housing; and first anti-vibration means securing said housing within said first frame so as to substantially prevent vibration of said housing within said first frame in a first plane.

35. A disk drive system according to claim 34 further comprising: a second frame in which said first frame is mounted and second anti-vibration means for use in securing said first frame within said second frame so as to substantially prevent vibration of said housing in a second plane with such second plane being perpendicular to the first plane of said first anti-vibration means.

36. A computer disk drive dystem for operating a micro hard-disk, said disk drive system comprising:
at least one micro hard-disk;
means for rotatably supporting said micro hard-disk;
means for rotating said hard-disk;
transducer means for writing digital information on and reading digital information from said hard-disk;
positioning means for moving said transducer means between the tracks on said hard-disk; and,
electronic circuit means for implementing the operation of said disk drive system, said electronic circuit means being arranged on a single printed circuit board; and
wherein said electronic circuit includes means for reducing current drawn by a stepper motor in response to deselection of said disk drive system by a host computer.

37. A disk drive system according to claim 36 wherein said electronic circuit means causes heat dissipation at a rate between 8 and 12 watts.

38. A disk drive system according to claim 36 wherein when said disk drive system is de-selected said electronic circuit reduces the rate of heat dissipation by approximately 4 watts.

39. A computer disk drive system for operating a micro hard-disk, said disk drive system comprising:
at least one micro hard-disk;
means for rotatably supporting said hard-disk;
means for rotating said hard-disk;
transducer means having two read/write heads for writing digital information on and reading digital information from said hard-disk on both planar sides of said hard-disk in a format so that said hard-disk has digital information stored on concentric tracks at a density equivalent to at least 5 Megabytes per disk; and,
positioning means for moving said transducer means between the tracks on said hard-disk, said positioning means including a stepper motor and means for operating said stepper motor in full step increments with each step being 0.9°, which increment causes said transducer means to move from one track to the next adjacent track on said hard-disk.

40. A computer disk drive system for operating a micro hard-disk, said disk drive system comprising:
at least one micro hard-disk;
means for rotatably supporting said hard-disk;
means for rotating said hard-disk;
transducer means for writing digital information on and reading digital information from said hard-disk in a format so that said hard-disk has digital information stored on concentric tracks at a density equivalent to at least 5 Megabytes per hard-disk; and,
positioning means for moving said transducer means between the tracks on said hard-disk, said positioning means being formed of selected materials for compensating for any mispositioning arising from thermal effects between said transducer means and a track on said hard-disk, said positioning means including a stepper motor and means for operating said stepper motor in full step increments with each step being 0.9°, which increment causes said transducer means to move from one track to the next adjacent track on said hard-disk.

41. A computer disk drive system for operating a micro hard-disk, said disk drive system comprising:
at least one micro hard-disk;
means for rotatably supporting said hard-disk;
means for rotating said hard-disk;
transducer means for writing digital information on and reading digital information from said hard-disk in a format so that said hard-disk has digital information stored on concentric tracks at a density equivalent to at least 5 Megabytes per hard-disk; and,
positioning means for moving said transducer means between the tracks on said hard-disk, said positioning means being formed of selected materials for compensating for any mispositioning arising from thermal effects between said transducer means and a track on said hard-disk, said positioning means including a two-phase bipolar stepper motor which operates in a full step mode.

42. A computer disk drive system for operating a micro hard-disk, said disk drive system comprising:
at least one micro hard-disk;
means for rotatably supporting said hard-disk;
means for rotating said hard-disk;
transducer means having two read/write heads for writing digital information on and reading digital information from said hard-disk on both planar sides of said hard-disk in a format so that said hard-disk has digital information stored on concentric tracks at a density equivalent to at least 5 Megabytes per hard-disk;
positioning means for moving said transducer means between the tracks on said hard-disk, said positioning means including a two-phase bi-polar stepper motor which operates in a full step mode;
a housing in which the hard-disk, said transducer means and at least a portion of said positioning means are contained;
a first frame for holding said housing;
first anti-vibration means for securing said housing within said first frame so as to substantially prevent vibration of said housing within said first frame in a first plane;

a second frame in which said first frame is mounted; and, second anti-vibration means for use in securing said first frame within said second frame so as to substantially prevent vibration of said housing in a second plane with such second plane being perpendicular to the first plane of said first anti-vibration means.

43. A computer disk drive system for operating a micro hard-disk, said disk drive system comprising:

at least one micro hard-disk;

means for rotatably supporting said hard-disk;

means for rotating said hard-disk;

transducer means having two read/write heads for writing digital information on and reading digital information from said hard-disk on both planar sides of said hard-disk in a format so that said hard-disk has digital information stored on concentric tracks at a density equivalent to at least 5 Megabytes per hard-disk;

positioning means for moving said transducer means between the tracks on said hard-disk, said positioning means being formed of selected materials for compensating for any mispositioning arising from thermal effects between said transducer means and a track on the hard-disk;

a housing in which said hard-disk, said transducer means and at least a portion of said positioning means are contained;

a first frame for holding said housing;

first anti-vibration means for securing said housing within said first frame so as to substantially prevent vibration of said housing within said first frame in a first plane;

a second frame in which said first frame is mounted; and, second anti-vibration means for use in securing said first frame within said second frame so as to substantially prevent vibration of said housing in a second plane with such second plane being perpendicular to the first plane of said first anti-vibration means.

44. A computer disk drive system for operating a micro hard-disk, said disk drive system comprising:

at least one micro hard-disk;

means for rotatably supporting said hard-disk;

means for rotating said hard-disk;

transducer means having two read/write heads for writing digital information on and reading digital information from said hard-disk on both planar sides of said hard-disk in a format so that said hard-disk has digital information stored on concentric tracks at a density equivalent to at least 5 Megabytes per hard-disk;

positioning means for moving said transducer means between the tracks on said hard-disk, said positioning means including a stepper motor and means for operating said stepper motor in full step increments with each step increment being 0.9°, which increment causes said transducer means to move from one track to the next adjacent track on said hard-disk;

a housing in which said hard-disk, said transducer means and at least a portion of said positioning means are contained;

a first frame for holding said housing;

first anti-vibration means for securing said housing within said first frame so as to substantially prevent vibration of said housing within said first frame in a first plane;

a second frame in which said first frame is mounted; and, second anti-vibration means for use in securing said first frame within said second frame so as to substantially prevent vibration of said housing in a second plane with such second plane being perpendicular to the first plane of said first anti-vibration means.

45. A computer disk drive system for operating a micro hard-disk, said disk drive system comprising:

at least one micro hard-disk;

means for rotatably supporting said hard-disk;

means for rotating said hard-disk;

transducer means having two read/write heads for writing digital information on and reading digital information from said hard-disk on both planar sides of said hard-disk in a format so that said hard-disk has digital information stored on concentric tracks at a density equivalent to at least 5 Megabytes per hard-disk;

positioning means for moving said transducer means between the tracks on said hard-disk, said positioning means including a two-phase bipolar stepper motor which operates in a full step mode, and said positioning means being formed of selected materials for compensating for any mispositioning arising from thermal effects between said transducer means and a track on said hard-disks;

a housing in which said hard-disk, said transducer means and at least a portion of said positioning means are contained;

a first frame for holding said housing;

first anti-vibration means for securing said housing within said first frame so as to substantially prevent vibration of said housing within said first frame in a first plane;

a second frame in which said first frame is mounted; and, second anti-vibration means for use in securing said first frame within said second frame so as to substantially prevent vibration of said housing in a second plane with such second plane being perpendicular to the first plane of said first anti-vibration means.

* * * * *

REEXAMINATION CERTIFICATE (953rd)
United States Patent [19]

McGinlay et al.

[11] B1 4,568,988
[45] Certificate Issued    Nov. 29, 1988

[54] MICRO HARD-DISK DRIVE SYSTEM

[75] Inventors: James G. McGinlay, Kirkcaldy; Roderick M. Urquhart, Glenrothes, both of Scotland

[73] Assignee: Rodime plc, Glenrothes, Scotland

Reexamination Request:
No. 90/001,337, Sep. 28, 1987

Reexamination Certificate for:
Patent No.: 4,568,988
Issued: Feb. 4, 1986
Appl. No.: 582,554
Filed: Feb. 22, 1984

[51] Int. Cl.⁴ .................. G11B 5/012; G11B 5/55; G11B 5/56
[52] U.S. Cl. .................................. 360/77; 360/78
[58] Field of Search ........................ 360/97–98, 360/77–78, 106, 135; 318/611, 634

[56] References Cited

U.S. PATENT DOCUMENTS

| | | | |
|---|---|---|---|
| 3,500,363 | 3/1970 | Shill | 360/97 |
| 3,609,721 | 9/1971 | Meneley | 360/97 |
| 3,849,800 | 11/1974 | Cuzner et al. | 360/97 |
| 3,893,012 | 7/1975 | Lin | |
| 3,924,268 | 12/1975 | McIntosh et al. | 360/78 |
| 4,035,708 | 7/1977 | Schaff | |
| 4,062,049 | 12/1977 | Dirks | 360/78 |
| 4,149,207 | 4/1979 | Porter et al. | 360/133 |
| 4,161,004 | 7/1979 | Dalziel | 360/106 |
| 4,163,996 | 8/1979 | Kaseta et al. | 360/97 |
| 4,164,766 | 8/1979 | Kaseta et al. | 360/97 |
| 4,164,769 | 8/1979 | Kaseta et al. | 360/106 |
| 4,185,310 | 1/1980 | Kaseta et al. | 360/97 |
| 4,194,226 | 3/1980 | Kaseta et al. | 360/106 |
| 4,277,732 | 7/1981 | Hittel et al. | |
| 4,317,146 | 2/1982 | Gervais | 360/98 |
| 4,323,939 | 4/1982 | Iftikar et al. | 360/106 |
| 4,334,252 | 6/1982 | Torici | 360/104 |
| 4,367,502 | 1/1983 | Iftikar et al. | 360/98 |
| 4,385,333 | 5/1983 | Hasler | 360/97 |
| 4,392,095 | 7/1983 | Ruxton | 318/254 |
| 4,399,477 | 8/1983 | Bryer | 360/106 |
| 4,419,701 | 12/1983 | Harrison et al. | 360/77 |
| 4,423,450 | 12/1983 | Hamilton | 360/111 |
| 4,428,012 | 1/1984 | Applequist et al. | 360/106 |
| 4,484,124 | 11/1984 | White | 318/696 |
| 4,485,419 | 11/1984 | Vinal | 360/125 |
| 4,488,187 | 12/1984 | Alaimo | 360/77 |
| 4,488,192 | 12/1984 | Treseder | 360/98 |
| 4,489,259 | 12/1984 | White | 318/696 |
| 4,491,888 | 1/1985 | Brown et al. | 360/97 |
| 4,503,474 | 3/1985 | Nigam | 360/133 |
| 4,504,879 | 3/1985 | Toldi | 360/105 |
| 4,509,160 | 4/1985 | Eggers | 369/269 |
| 4,510,544 | 4/1985 | Lazzari | 360/114 |
| 4,516,177 | 5/1985 | Moon et al. | 360/77 |
| 4,516,178 | 5/1985 | Lee | 360/78 |
| 4,518,904 | 5/1985 | MacLeod | 318/685 |
| 4,538,192 | 8/1985 | White | 360/98 |
| 4,541,019 | 9/1985 | Precourt | 360/15 |
| 4,547,822 | 10/1985 | Brown | 360/78 |
| 4,555,189 | 11/1985 | Donkin | 360/106 |
| 4,573,094 | 2/1986 | Gibeau et al. | 360/106 |
| 4,599,666 | 7/1986 | Liu et al. | |
| 4,638,384 | 1/1987 | Stewart | 360/77 |

FOREIGN PATENT DOCUMENTS

| | | | |
|---|---|---|---|
| 0055568 | 7/1982 | European Pat. Off. | |
| 0068802 | 1/1983 | European Pat. Off. | |
| 0097363 | 1/1984 | European Pat. Off. | 360/135 |
| 57-172572 | 10/1983 | Japan | |
| 792729 | 4/1958 | United Kingdom | |
| 2074364 | 10/1981 | United Kingdom | 360/71 |

OTHER PUBLICATIONS

Computer Design, Sep. 1982, pp. 111–118, Winchester Technology Brings More Storage to Microsystems, M. Deidson.

Japanese Publication, vol. 56, No. 10, 1982, pp. 64(770)–67(773), Mitsubishi) Five-Inch Hard Disk Drive M4863, Fukao et al.

Electronic Design, Oct. 25, 1980, pp. 103–108, Novel Minifloppy Drive Doubles Track Density, D. Cribbs.

Electronic Design 9, Apr. 26, 1980, pp. 205–209, Stepper Motors Convert Pulses to Accurate Mechanical Steps, E. Madsen.

Mini-Micro Systems, Jun. 1982, pp. 239, 243, 244, 3.9-in. Winchester Features Removable Media, A. Roman.

Kikkei Mechanical, Dec. 6, 1982, Advertisement, Japan Servo Co., Ltd.

Syquest SQ306, Product Brochure, 5/82.

Syquest SQ306 R,F and Q-Pak Specifications Brochure 5/82.

McSparran, "Stepping Motor Control", IBM Tech. Disc. Bulletin, vol. 16, No. 7, 2/74.

Slingland, "Small Steps Turn into Big Improvements", Powerconversion International, 10/83.

Kozuchowski, et al., "Stepping Motors" Engineering, 5/79.

Cox, "Steeper Motor Drive/Controller Provides Power and Precision", Actuator Systems, 3/80.

IEEE Transactions on Magnetics, vol. MAG.-17, No. 6, Nov. 1981, pp. 2739–2741, A 2,000 Track/Inch Disk File Servo System Using a Magnetoresistive Head, R. L. Comstock et al.

Rodime Press Release, "Rodime Adds 40 and .53 Megabyte 5.25", Winchester Disk Drives to its RO 200 Series ; 12/7/82.

Electronics, International Newsletter, 10/6/82.

Rodime, "200 E Series Disk Drives, the Field Proven 5¼" Winchester.

Control Data 9270–6 Cricket Disc Drive, 4/83, Product Brochure.

News Release, Control Data, 3.5-inch "Cricket" Winchester, 5/16/83.

Syquest Technology, SQ306OEM Manual, SQT022; 1/83.

Dataquest Research Newsletter, "Syquest Introduces Sub-5.25-Inch Rigid Disk Drives", 8/82.

Mizoshita et al, Mechanical & Servo Design of A 10"

Disk Drive, IEEE transactions on Magnetics, vol. Mag-17, No. 4, 7/1981.
IBM Disk Storage Technology, pp. 83–85, Hearn, "Actuator for an 8″ Disk File", 2/1980.
Shiraishi, "8″ Fixed Magnetic Disk Unit," Hitachi Review, vol. 30, No. 2, pp. 65–69, 1981.
Electronic Times "Miniature Drive Hits the Standard Problem", 3/24/83.
Disctron, Inc., "D600 5¼ Inch Winchester Half-Height Disc Drive 25.5 Mb to 42.5 Mb", Nov. 1982.
Disctron, Inc., "New Disctron 5¼ Inch Half-Height Winchester Disk Drives Store 25.5 and 42.5 Megabytes with 40 Millisecond Access Time", Nov. 29, 1982.
Shiraishi et al., "8-inch Fixed Magnetic Disk Unit", Hitachi Review, vol. 30 (1981), No. 2, pp. 65–69.
McLeod, J., "Special Report: Small Storage Peripherals Grow Even Smaller in Cost and Size", Systems & Software, Sep. 1982, pp. 36, 38–43.
Payne, C. R., "Microfloppies: A New Standard for '83", The Access Times, vol. VIII, No. 1, Mar. 1983, p. 2.
McLeod, J., "News: Standard Media Size and Packaging Key to Sub-4-inch Floppy's Future Success", Systems & Software, Sep. 1982, pp. 19–20.
Kalstrom, D., "Micro-Winchester Market Awaits Micro-Diskette Standards", Mini-Micro Systems, Apr. 1983.
Sony, "The New Line-Up of 3.5 Inch Micro Floppydisk Drives (1.0 Mb/2.0 Mb) from the Industry's Leading Supplier" (1982).
EDN, "Technology Update: Newest 5¼ Inch Winchester Disk Drive Boost Capacity in Standard-Sized Packages", Sep. 1, 1982.
3M Data Recording Products Division, "3M Brand Compact Disk Drives, Model 8432-20 Megabytes Capacity", Apr. 18, 1981.
3M Data Recording Products Division, "3M Brand 8400 Series—The Only Compact Disk Drives That Combine Both 25 Years of Media Experience and the ANSI Interface", Apr. 18, 1981.
Hokushin Electric Works, Ltd., "CD 8000 Expand Your System Versatility with Low Cost 8 Inch Winchester", 1980.
Shugart, "Preliminary OEM Manual: SA700 5.25 Inch Half-Height Fixed Disk Drive", Jan. 1983.
Shugart, Preliminary Reference Manual—Shugart 706/712 Rigid Disk Storage Drive, Jun. 1984.
Glaub, J. C. et al., "Thermal Expansion Analysis of Fixed Disc Storage Drives", 1981, pp. 1–7.

"IBM 341 4-inch Diskette Drive—OEM Product Description and Maintenance", Mar. 1983.
"Introducing the IBM 341 Disk Drive", Mar. 1983.
Syquest, Letter and attached "Proposal for First Draft of Proposed American Standard for 100 mm × 40 mm Disc Cartridge", Jan. 20, 1983.
Information relating to Mitsubishi Computer Peripherals, Model M4863 5¼ inch Fixed Disk Drive, 1982.
Late News: "Sub-4-inch Winchester Will Meet 3¼ in. Form Factor", Electronic Design, Feb. 3, 1983.
"M223X Microdisk Drives", Fujitsu, vol. 34, No. 2 (1983) and translation.
"OEM Microdisk Drives–M2230 AS/B . . .", Fujitsu America, Inc., 11/1983.
Syquest SQ306F, SQ312F, SQ325 Product Brochure (Photograph).
Syquest SQ306 Product Brochure (Photograph).
1982 Disk/Trend Report (selected pages), 9/82.
Information Relating to Shugart SA706/712 and 706/712, Model Disk Drives.
Shugart Product Selection Guide, 4/83.
RMS 504,509,513,518 Product Brochure, 1981.
RMS 504/509/513/518 5¼ Inch Winchester Disk Drive Product Brochure, 9/82.
Mini-Micro Systems, advertisement re: IMI 5000H Series Drives, 6/82.
IMI 5000H Series OEM Manual, p. 1-1, 8-26-82.
Seagate Technology, Press Release, 8-31-83.
Alar Report, vol. 1, No. 2, 2/1983.

*Primary Examiner*—Robert L. Richardson

[57] ABSTRACT

A micro-Winchester disk drive system particularly suited to meet the demands of a portable computer system. The micro-Winchester disk is a Winchester disk of 85–100 mm in diameter. This disk drive system by virtue of its small size and vibration isolation is ideally suited for use in portable computer systems. The micro-Winchester disk drive system was developed to store data at a density of 600 tracks per inch utilizing open-loop positioning mechanism. This disk drive system provides fast access data storage for use with small business computers, terminals and microprocessor based systems, portable or otherwise, and many other areas where compact, rugged light-weight hard-disk storage is required. The disk drive system of the present invention normally utilizes either one or two hard disks such as Winchester disks and provides data storage on each disk in excess of 5 Megabytes, once the disks are formatted.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7, line 62–68:
The positioning mechanism is shown in greater detail in FIG. 4. This positioning mechanism is mounted on the base of housing 50 within chamber 52 of the disk drive system. Chamber 52 is formed by chamber housing 50 and top cover 38. Winchester disk 24 is mounted on a hub assembly 54 within chamber housing 52 so that it is rotated within the chamber by the d.c. motor 32. *As illustrated in FIG. 4, the housing has a width substantially the same as the diameter of disk 24.*

The patentability of claims 36–38, 42, 43 and 45 is confirmed.

Claims 2, 3, 17, 19–21, 34 and 35 are cancelled.

Claims 1, 4, 5, 8–16, 18, 22, 23, 26–31, 33, 39–41 and 44 are determined to be patentable as amended.

Claims 6, 7, 24, 25 and 32, dependent on an amended claim is determined to be patentable.

AS A RESULT OF REEXAMINATION, IT HAS BEEN DETERMINED THAT:

1. A computer disk drive system [for operating a micro hard-disk, said disk drive system] comprising:
   at least one micro hard-disk *having a diameter of between 85 and 100 millimeters and having a plurality of concentrically adjacent tracks on each side thereof;*
   means for rotatably supporting said micro hard-disk;
   means for rotating said *micro* hard-disk;
   transducer means for writing digital information on and reading digital information from said *micro* hard-disk in a format so that said *micro* hard-disk has digital information stored at a density of approximately 600 concentric tracks per inch; [and,]
   open-loop positioning means [for moving said transducer means between the tracks on said hard-disk] *including means pivotally arranged for moving said transducer means along an arcuate path extending in an approximately radial direction with respect to said micro hard-disk so that said transducer means can move between the innermost and outermost concentric tracks on said micro hard-disk,* said positioning means including a stepper motor and means for operating said stepper motor in full step increments with each step increment being 0.9°, which increment causes said transducer means to move from one track to the next adjacent track on said *micro* hard-disk.

[2. A disk drive system according to claim 1 wherein said positioning means is pivotally arranged for moving said transducer means along a path extending in an approximately radial direction with respect to said hard-disk so that said transducer means can move between the innermost and outermost tracks on said hard-disk.]

[3. A disk drive system according to claim 2 wherein said positioning means moves said transducer means along an arcuate path extending in a radial direction with respect to said hard-disk.]

4. A disk drive system according to claim [2] *1* wherein said [positioning] means *pivotally arranged* includes a support arm arranged to extend in a radial direction with respect to said *micro* hard-disk and supporting said transducer means with said transducer means being mounted at one end of said support arm, a pivot shaft, and a positioning arm attached to the other end of said support arm and having one end thereof coupled to said pivot shaft for enabling said positioning arm to be pivoted about the axis of said pivot shaft, said pivot shaft being located on one side of said support arm and spaced away from said support arm.

5. A disk drive system according to claim 4 wherein said positioning means further includes:
   a bearing assembly coupled to said pivot shaft to which said positioning arm is coupled;
   [a stepper motor having] an output drive shaft *attached to said stepper motor;*
   a tensioned steel band coupled to said drive shaft of said stepper motor and coupled to said positioning arm at the end of said positioning arm on the opposite side of said support arm from said pivot shaft; and,
   said band being arranged in a pulley arrangement for coupling said drive shaft of said stepper motor with said positioning arm so that rotational movement of said stepper motor causes pivoting of said positioning arm about said pivot shaft for moving said support arm and said transducer means in incremental steps across the tracks of said *micro* hard-disk.

8. A disk drive system according to claim 5 [wherein] *further including a housing in which said micro hard-disk, said means for rotatably supporting, said transducer means and said positioning means are supported and contained,* said positioning means, *said micro hard-disk and said housing* [is] *being* formed of selected materials for automatically compensating for any mispositioning arising from thermal effects between said transducer means and a track on said *micro* hard-disk.

9. A disk drive system according to claim 8 wherein [said] *portions of said micro hard-disk, said housing and said* positioning means [includes] *are included in* a primary thermal loop that causes said transducer means on average to move [outwardly] *inwardly* from a track center as temperature rises and *in* a compensating thermal loop that causes a countermovement thereby tending to maintain said transducer means on track center.

10. A disk drive system according to claim 8 wherein: said positioning arm is formed of a first class of material; said *micro* hard-disk and *said* housing of said disk drive system are formed of a second class of material: said support arm, said pivot shaft and said tensioned band are formed of a third class of material; said first class of material, said second class of material and said third class of [materials] *material* have different coefficients of thermal expansions; and the arrangement of these parts [being] *is* such that in response to a change in temperature, these various components of said positioning mechanism, *said micro hard-disk and said housing* react in such a way that said support arm effectively rotates via said positioning arm and said pivot shaft so as to maintain said transducer means substantially at its original track position.

11. A computer disk drive system [for operating a micro hard-disk, said disk drive system] comprising:

at least [one] *two* micro [hard-disk ] *hard-disks each having a diameter of between 85 and 100 millimeters and each having a plurality of concentrically adjacent tracks on each side thereof;* means for rotatably supporting said micro [hard-disk] *hard-disks;* means for rotating said [hard disk] *micro hard-disks;* transducer means for writing digital information on and reading digital information from said [hard-disk] *micro hard-disks on both sides of each micro hard-disk* in a format so that [said] *each micro* hard-disk has digital information stored *on said concentrically adjacent tracks* at a density *providing at least 5 Megabytes of storage per micro hard-disk with the digital information being stored at a density of approximately 600 concentric tracks per inch;* and, open-loop positioning means [for moving said transducer means between the tracks on said hard-disk] , *including means pivotally arranged for moving said transducer means along an arcuate path extending in an approximately radial direction with respect to said micro hard-disks so that said transducer means can move between the innermost and outermost concentric tracks on said micro hard-disks,* said positioning means being formed of selected materials for compensating for any mispositioning arising from thermal effects between said transducer means and a track on said [hard-disk] *micro hard-disks.*

12. A disk drive system according to claim 11 [wherein] *further including a housing in which said micro hard-disks, said means for rotatably supporting, said transducer means, and said positioning means are supported and contained, with portions of* said *micro hard-disks, said housing and said* positioning means [includes] *being included in* a primary thermal loop that causes said transducer means on average to move [outwardly] *inwardly* from a track center as temperature rises and *in* a compensating thermal loop that causes a counter-*movement thereby tending to maintain said transducer means on track center.*

13. A positioning mechanism for positioning a read/write head for use in a disk drive assembly for reading data from and writing data on a hard-disk, said positioning mechanism comprising:

a support arm arranged to extend in an approximately radial direction with respect to the hard-disk and supporting the read/write head with the read/write head being mounted at one end of said support arm;

a pivot shaft;

a positioning arm attached to the other end of said support arm and having one end thereof coupled to said pivot shaft for enabling said positioning arm to be pivoted about the axis of said pivot shaft, said pivot shaft being located on one side of said support arm and spaced away from said support arm;

a bearing assembly coupled to said pivot shaft to which said positioning arm is coupled;

a stepper motor having an output drive shaft;

a tensioned steel band coupled to said drive shaft of said stepper motor and coupled to said positioning arm at the end of said positioning arm on the opposite side of said support arm from said pivot shaft and said band being arranged in a pulley arrangement for coupling said drive shaft of said stepper motor with said positioning arm so that rotational movement of said stepper motor causes pivoting of said positioning arm about said pivot shaft for moving said support arm and the read/write head in incremental steps across the tracks of the hard-disk; [and,]

*said positioning arm formed of a first class of material;*

*said hard-disk and housing of said disk drive system formed of a second class of material;*

*said support arm, said pivot shaft and said tensioned band formed of a third class of material;*

*said first class of material, said second class of material and said third class of material having different coefficients of thermal expansion; and*

*the arrangement of these parts being such that in response to a change in temperature, these various components of said positioning mechanism react in such a way that said support arm effectively rotates via said positioning arm and said pivot shaft so as to maintain said transducer means substantially at its original track position* [wherein] *whereby* said positioning [means] *mechanism* is formed of selected materials for automatically compensating for any mispositioning arising from thermal effects between said transducer means and a track on the hard-*disk.*

14. A [disk drive system] *positioning mechanism* according to claim 13 wherein said stepper motor is a two-phase bipolar stepper motor and operates in a full step mode.

15. A [disk drive system] *positioning mechanism* according to claim 13 wherein said bearing assembly includes a pair of ball bearings arranged in a back-to-back configuration with a dimensional pre-load of approximately 5 pounds force and said steel band is a band of stainless steel with a tensile strength of greater than approximately 250,000 psi.

16. A [disk drive system] *positioning mechanism* according to claim 13 [wherein] *in combination with a housing in which said hard-disk and said positioning mechanism are contained and supported, with portions of* said positioning *mechanism, said housing and said hard-disk being included in* [means includes] a primary thermal loop that causes said transducer means on average to move [outwardly] *inwardly* from a track center as temperature rises and *in* a compensating thermal loop that causes a counter-movement thereby tending to maintain said transducer means on track center. [17. A disk drive system according to claim 13 wherein: said positioning arm is formed of a first class material; said hard-disk and housing of said disk drive system are formed of a second class of material; said support arm, said pivot shaft and said tensioned band are formed of a third class of material; said first class of material, said second class of material and said third class of material have different coefficients for thermal expansions; and the arrangement of these parts being such that in response to a change in temperature, these various components of said positioning mechanism react in such a way that said support arm effectively rotates via said positioning arm and said pivot shaft so as to maintain said transducer means substantially at its original track position.]

18. A computer disk drive system [for operating a micro hard-disk, said disk drive system] comprising:
   at least [one] *two* micro [hard-disk] *hard-disks each having a diameter between 92 and 96 millimeters and each having a plurality of concentrically adjacent tracks on each planar side thereof;*
   means for rotatably supporting [at least one] said [hard-disk] *micro hard-disks;*
   means for rotating said [hard-disk] *micro hard-disks;*
   *first and second* transducer means *each* having two read/write heads for writing digital information on and reading digital information from said [hard-disk] *micro hard-disks* on both planar sides of [said] *each micro* hard-disk in a format so that [said] *each micro* hard-disk has digital information stored *on said concentrically adjacent tracks* at a density *providing at least 5 Megabytes of storage per micro hard-disk with the digital information being stored at a density* of approximately 600 concentric tracks per inch; and,
   positioning means [for moving transducer means between the tracks on said hard-disk] *including means pivotally arranged for moving said first and second transducer means along an arcuate path extending in an approximately radial direction with respect to said micro hard-disks so that said first and second transducer means can move between the innermost and outermost concentric tracks on said micro hard-disks,* said positioning means including a stepper motor and means for operating said stepper motor in full step increments with each step increment being 0.9° which increment causes said *first and second* transducer means to move from one track to the next adjacent track on said [hard-disk] *micro hard-disks.*

[19. A disk drive system according to claim 18 further comprising two micro hard-disks mounted on said means for rotatably supporting said hard-disks and said disk drive system operates so that each of said hard-disks is capable of storing at least 5 Megabytes of information.]

[20. A disk drive system according to claim 19 wherein said positioning means is pivotally arranged for moving said transducer means along a path extending in an approximately radial direction with respect to said hard-disks so that said transducer means can move between the innermost and outermost tracks on said hard-disks.]

[21. A disk drive system according to claim 20 wherein said positioning means moves said transducer means along an arcuate path extending in a radial direction with respect to said hard-disks.]

22. A disk drive system according to claim [20] *18* wherein said [positioning] means *pivotally arranged* includes [a] *four* support [arm] *arms* arranged to extend in a radial direction with respect to said *micro* hard-disks and [supporting said transducer means with] *to support* said read/write heads of said *first and second* transducer means, *said read/write heads* being mounted at one end of [said] *a respective* support arm, a pivot shaft[;], and a positioning arm attached to the other end of said support [arm] *arms* and having one end thereof coupled to said pivot shaft for enabling said positioning arm to be pivoted about the axis of said pivot shaft[;], said pivot shaft being located on one side of said support [arm] *arms* and spaced away from said support [arm] *arms.*

23. A disk drive system according to claim 22 wherein said positioning means further includes:
   a bearing assembly coupled to said pivot shaft to which said positioning arm is coupled;
   [a stepper motor having] an output drive shaft *attached to said stepper motor;*
   a tensioned steel band coupled to said drive shaft of said stepper motor and coupled to said positioning arm at the end of said positioning arm on the opposite side of said support [arm] *arms* from said pivot shaft; and,
   said band being arranged in a pulley arrangement for coupling said drive shaft of said stepper motor with said positioning arm so that rotational movement of said stepper motor causes pivoting of said positioning arm about said pivot shaft for moving said support [arm] *arms* and said *first and second* transducer means in incremental steps across the tracks of said *micro* hard-disks.

26. A disk drive system according to claim 23 [wherein] *further including a housing in which said micro hard-disk, said means for rotatably supporting, said first and second transducer means and said positioning means are supported and contained,* said positioning means, *said micro hard-disks and said housing being* [is] formed of selected materials for automatically compensating for any mispositioning arising from thermal effects between said *first and second* transducer means and a *respective* track on said *micro* hard-disks.

27. A disk drive system according to claim 26 wherein [said] *portions of said micro hard-disks, said housing and* said positioning means [includes] *are included in* a primary thermal loop that causes said *first and second* transducer means on average to move [outwardly] *inwardly* from a track center as temperature rises and *in* a compensating thermal loop that causes a counter-movement thereby tending to maintain said *first and second* transducer means on track center.

28. A disk drive system according to claim 26 wherein: said positioning arm is formed of a first class of material; said *micro* hard-disks and *said* housing of said disk drive system are formed of a second class of material; said support [arm] *arms,* said pivot shaft and said tensioned band are formed of a third class of material; said first class of material, said second class of material and said third class of material have different coefficients of thermal expansions; and the arrangement of these parts being such that in response to a change in temperature, these various components of said positioning mechanism, *said micro hard-disks and said housing react in such a way that said support arm effectively rotates via said positioning arm and said pivot shaft so as to maintain said first and second* transducer means substantially at its original track position.

29. A disk drive system according to claim [20 wherein] *18 further including a housing in which said micro hard-disks, said means for rotatably supporting, said first and second transducer means and said positioning means are supported and contained,* said positioning means, *said micro hard-disks and said housing being* [is] formed of selected materials for automatically compensating for any mispositioning arising from thermal effects between said *first and second* transducer means and a track on said *micro* hard-disks.

30. A disk drive system according to claim 29 wherein [said] *portions of said micro hard-disks, said*

*housing and said* positioning means [includes] *are included in* a primary thermal loop that causes said *first and second* transducer means on average to move [outwardly] *inwardly* from a track center as temperature rises and *in* a compensating thermal loop that causes a counter-movement thereby tending to maintain said *first and second* transducer means on track center.

31. A disk drive system according to claim [20] *18* further comprising: a housing in which said *micro* hard-disks, said *first and second* transducer means and at least a portion of said positioning means are contained; a first frame for holding said housing; [said] *and* first anti-vibration means for securing said housing within said first frame so as to substantially prevent vibration of said housing within said first frame in a first plane.

33. A computer Winchester disk drive system [for operating a micro-Winchester disk, said disk drive system] comprising:
 at least one micro-Winchester disk having a diameter of approximately 96 mm *and a plurality of concentrically adjacent tracks on each side thereof;*
 means for rotatably supporting said micro-Winchester disk;
 means for rotating said micro-Winchester disk;
 transducer means for writing digital information on and reading digital information from said micro-Winchester disk in a format so that said micro-Winchester disk has digital information stored at a density of approximately 600 concentric tracks per inch; and,
 open-loop positioning means for moving said transducer means between the tracks on said micro-Winchester disk, said positioning means including a stepper motor and means for operating said stepper motor in full step increments with each step increment being 0.9° which increment causes said transducer means to move from one track to the next adjacent track[.];
 *a housing in which the micro-Winchester disk, said transducer means and at least a portion of said positioning means are contained;*
 *a first frame for holding said housing;*
 *first anti-vibration means securing said housing within said first frame so as to substantially prevent vibration of said housing within said first frame in a first plane;*
 *a second frame in which said first frame is mounted; and*
 *second anti-vibration means for use in securing said first frame within said second frame so as to substantially prevent vibration of said housing in a second plane with such second plane being perpendicular to the first plane of said first anti-vibration means.*

[34. A disk drive system according to claim 33 further comprising: a housing in which the hard-disk, said transducer means and at least a portion of said positioning means are contained; a first frame for holding said housing; and first anti-vibration means securing said housing within said first frame so as to substantially prevent vibration of said housing within said first frame in a first plane.]

[35. A disk drive system according to claim 34 further comprising: a second frame in which said first frame is mounted and second anti-vibration means for use in securing said first frame within said second frame so as to substantially prevent vibration of said housing in a second plane with such second plane being perpendicular to the first plane of said first anti-vibration means.]

39. A computer disk drive system [for operating a micro hard-disk, said disk drive system] comprising:
 at least [one] *two* micro [hard-disk] *hard-disks each having a diameter between 92 and 96 millimeters and each having a plurality of concentrically adjacent tracks on both planar sides thereof;*
 means for rotatably supporting said [hard-disk] *micro hard-disks;*
 means for rotating said [hard-disk] *micro hard-disks;*
 *first and second* transducer means *each* having two read/write heads for writing digital information on and reading digital information from said [hard-disk] *micro hard-disks* on both planar sides of said [hard-disk] *micro hard-disks* in a format so that [said] *each micro* hard-disk has digital information stored on [concentric] *said concentrically adjacent* tracks at a density equivalent to at least 5 Megabytes per [disk] *micro hard-disk with the digital information being stored at a density of at least approximately 600 concentric tracks per inch;* and,
 positioning means [for moving said transducer means between the tracks on said hard-disk], *including means pivotally arranged for moving said first and second transducer means along an arcuate path extending in an approximately radial direction with respect to said micro hard-disks so that said first and second transducer means can move between the innermost and outermost concentric tracks on said micro hard-disks,* said positioning means including a stepper motor and means for operating said stepper motor in full step increments with each step being 0.9°, which increment causes said *first and second* transducer means to move from one track to the next adjacent track on said [hard-disk *micro hard-disks.*

40. A computer disk drive system [for operating a micro hard-disk, said disk drive system] comprising:
 at least [one] *two* micro [hard-disk] *hard-disks each having a diameter between 92 and 96 millimeters and each having a plurality of concentrically adjacent tracks on both planar sides thereof;*
 means for rotatably supporting said [hard-disk] *micro hard-disks;*
 means for rotating said [hard-disk] *micro hard-disks;*
 transducer means for writing digital information on and reading digital information from said [hard-disk] *micro hard-disks* in a format so that [said] each *micro* hard-disk has digital information stored on [concentric] *said concentrically adjacent* tracks at a density equivalent to at least 5 Megabytes per *micro* hard-disk *with the digital information being stored at a density of at least approximately 600 concentric tracks per inch;* and,
 positioning means [for moving said transducer means between the tracks on said hard-disk] *including means pivotally arranged for moving said transducer means along an arcuate path extending in an approximately radial direction with respect to said micro hard-disks so that said transducer means can move between the innermost and outermost concentric tracks on said micro hard-disks,* said positioning means being formed of selected materials for compensating for any mispositioning arising from thermal effects between said transducer means and a track on said *micro* hard-disk, said positioning means including a stepper motor and means for operating said stepper motor in full step increments with each step being 0.9°, which increment causes said transducer means to move from one track to the next adjacent track on said [hard-disk] *micro hard-disks.*

41. A computer disk drive system [for operating a micro hard-disk, said disk drive system] comprising:

at least [one] *two* micro hard-disk] *hard-disks each having a diameter between 92 and 96 millimeters and each having a plurality of concentrically adjacent tracks on both planar sides thereof;* means for rotatably supporting said [hard-disks] *micro hard-disks;* means for rotating said [hard-disk] *micro hard-disks;* transducer means for writing digital information on and reading digital information from said [hard-disk *micro hard-disks* in a format so that [said] each *micro* hard-disk has digital information stored on [concentric] *said concentrically adjacent* tracks at a density equivalent to at least 5 Megabytes per *micro* hard-disk *with the digital information being stored at a density of at least approximately 600 concentric tracks per inch;* and, positioning means [for moving said transducer means between the tracks on said hard-disk] *including means pivotally arranged for moving said transducer means along an arcuate path extending in an approximately radial direction with respect to said micro hard-disks so that said transducer means can move between the innermost and outermost concentric tracks on said micro hard-disks,* said positioning means being formed of selected materials for compensating for any mispositioning arising from thermal effects between said transducer means and a track on said [hard-disk] *micro hard-disks,* said positioning means including a two-phase bipolar stepper motor which operates in a full step mode.

44. A computer disk drive system for operating a micro hard-disk, said disk drive system comprising:

at least one micro hard-disk *having a plurality of concentrically adjacent tracks on both planar sides thereof;* means for rotatably supporting said hard-disk;

means for rotating said hard-disk;

transducer means having two read/write heads for writing digital information on and reading digital information from said hard-disk on both planar sides of said hard-disk in a format so that said hard-disk has digital information stored on concentric tracks at a density equivalent to at least 5 Megabytes per hard-disk;

positioning means for moving said transducer means between the tracks on said hard-disk, said positioning means including a stepper motor and means for operating said stepper motor in full step increments with each step increment being 0.9°, which increment causes said transducer means to move from one track to the next adjacent track on said hard-disk;

a housing in which said hard-disk, said transducer means and at least a portion of said positioning means are contained;

a first frame for holding said housing;

first anti-vibration means for securing said housing within said first frame so as to substantially prevent vibration of said housing within said first frame in a first plane;

a second frame in which said first frame is mounted; and, second anti-vibration means for use in securing said first frame within said second frame so as to substantially prevent vibration of said housing in a second plane with such second plane being perpendicular to the first plane of said first anti-vibration means.

* * * * *